United States Patent [19]
Gould et al.

[11] Patent Number: 5,563,649
[45] Date of Patent: Oct. 8, 1996

[54] SYSTEM AND METHOD FOR TRANSMITTING VIDEO MATERIAL

[76] Inventors: Kim V. W. Gould, 1629 Manhattan Ave., Hermosa Beach, Calif. 90254; Charles R. Abraham, 10294 Dempster Ave., Cupertino, Calif. 95014; Michael H. Porte, 1447 Third St., Santa Monica, Calif. 90405; Michael D. Elliott, 3631 Wasatch Ave., Los Angeles, Calif. 90066

[21] Appl. No.: 400,475

[22] Filed: Mar. 8, 1995

Related U.S. Application Data

[63] Continuation of Ser. No. 77,685, Jun. 16, 1993, abandoned.
[51] Int. Cl.$^6$ ............................... H04M 11/00; H04N 7/14
[52] U.S. Cl. ................................... 348/17; 348/14
[58] Field of Search ........................... 348/13, 14, 15, 348/16, 17, 18, 19, 6, 7, 8, 12, 384; 455/4.1, 4.2, 5.1, 6.3, 3.1; 379/96

[56] References Cited

U.S. PATENT DOCUMENTS

| | | | |
|---|---|---|---|
| 4,843,466 | 6/1989 | Music et al. | 358/133 |
| 4,953,196 | 8/1990 | Ishikawa et al. | 379/53 |
| 5,062,136 | 10/1991 | Gattis et al. | 380/18 |
| 5,111,292 | 5/1992 | Kuriacose et al. | 358/133 |
| 5,122,875 | 6/1992 | Raychaudhuri et al. | 358/133 |
| 5,130,792 | 7/1992 | Tindell et al. | 358/85 |
| 5,132,992 | 7/1992 | Yurt et al. | 455/5.1 |
| 5,138,459 | 8/1992 | Roberts et al. | 358/209 |
| 5,144,424 | 9/1992 | Savatier | 358/133 |
| 5,144,425 | 9/1992 | Joseph | 358/133 |
| 5,146,325 | 9/1992 | Ng | 358/135 |
| 5,148,272 | 9/1992 | Acampora et al. | 358/133 |
| 5,151,783 | 9/1992 | Faroudja | 358/133 |
| 5,151,784 | 9/1992 | Lavagetto et al. | 358/136 |
| 5,168,356 | 12/1992 | Acampora et al. | 358/133 |
| 5,168,375 | 12/1992 | Reisch et al. | 358/432 |
| 5,175,617 | 12/1992 | Wallace et al. | 358/133 |
| 5,185,819 | 2/1993 | Ng et al. | 382/56 |
| 5,191,436 | 3/1993 | Yonemitsu | 358/335 |
| 5,193,004 | 3/1993 | Wang et al. | 358/136 |
| 5,198,901 | 3/1993 | Lynch | 358/136 |
| 5,247,347 | 9/1993 | Litteral et al. | 348/12 |
| 5,253,275 | 10/1993 | Yurt et al. | 348/7 |
| 5,253,341 | 10/1993 | Rozmanith et al. | 348/12 |
| 5,287,420 | 2/1994 | Barrett | 348/384 |

FOREIGN PATENT DOCUMENTS

| | | | |
|---|---|---|---|
| 0226987 | 9/1990 | Japan | H04N 7/14 |

*Primary Examiner*—Wing F. Chan
*Assistant Examiner*—Stella Woo
*Attorney, Agent, or Firm*—Burns, Doane, Swecker & Mathis

[57] ABSTRACT

A "video fax" system electronically delivers a non-real time, full-motion, sub-broadcast quality facsimile of relatively short segments of video material from an originating location to a receiving location in a short period of time, utilizing selected widely available commercial telephone switched networks. At the originating location, analog source material is digitized, compressed, prepared for transmission and stored temporarily. Digital source material is handled by bypassing the digitization step and part of the compression step, and performing the necessary file conversion. The sending location dials up the receiving location, and a connection is established. The digital file is transmitted over the network. When finished, the connection is terminated. At the receiving location, the material is received, decompressed and converted back to either analog form or digital form, depending on the recipient's preference. Compression and decompression are each performed in two stages, with a real-time component performed at full-frame rate, and an offline secondary reduced frame-rate component. Alternatively, the compression is performed entirely at the reduced frame rate, which involves undoing of the compression component performed in real-time. The corresponding decompression involves decompressing entirely at a reduced frame rate, followed by recompressing in preparation for full-frame rate real-time decompression. Transmission over the telephone network is performed concurrently with the reduced frame rate compression, resulting in an overall faster transfer.

120 Claims, 19 Drawing Sheets

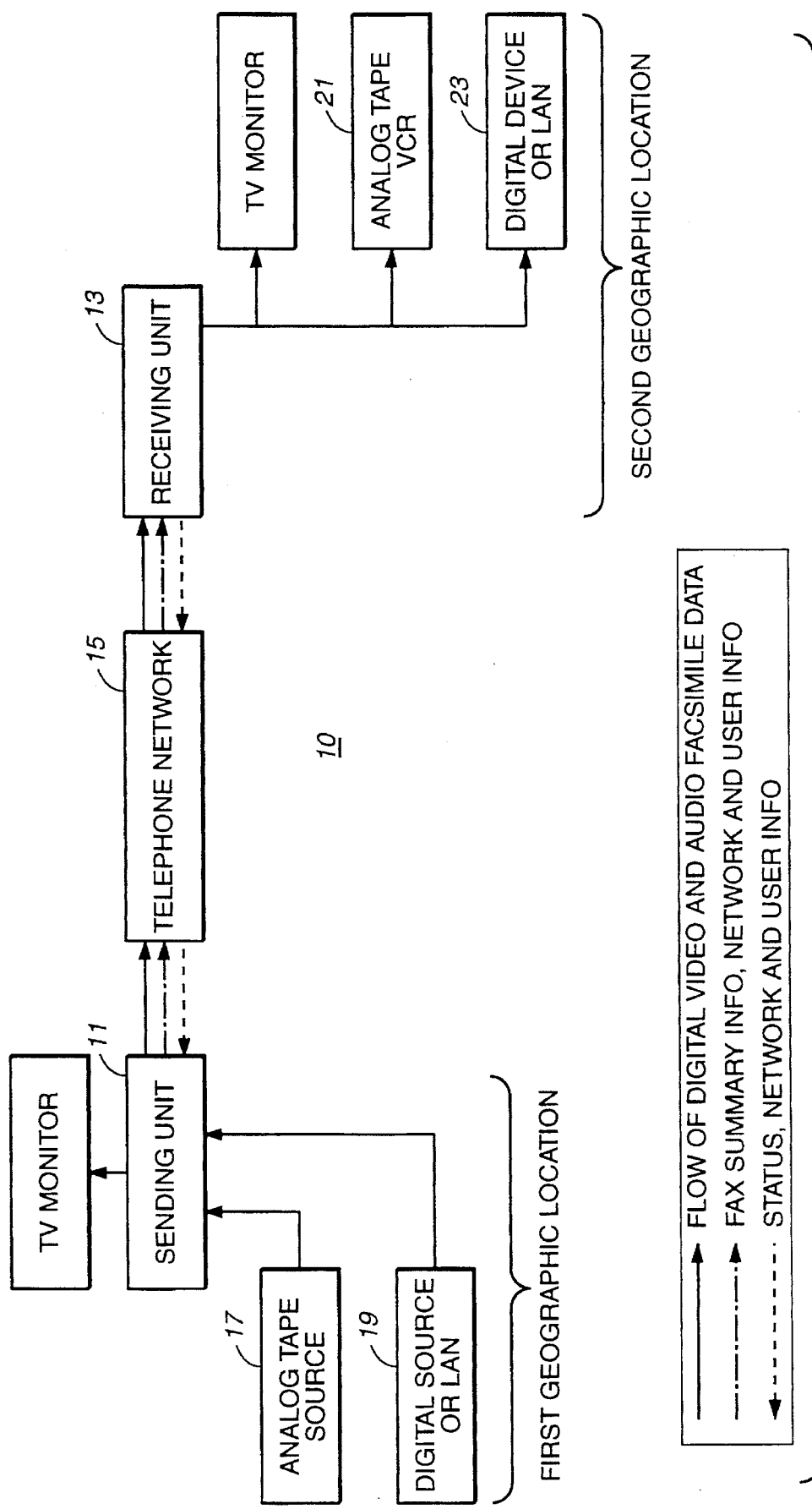
FIG._1

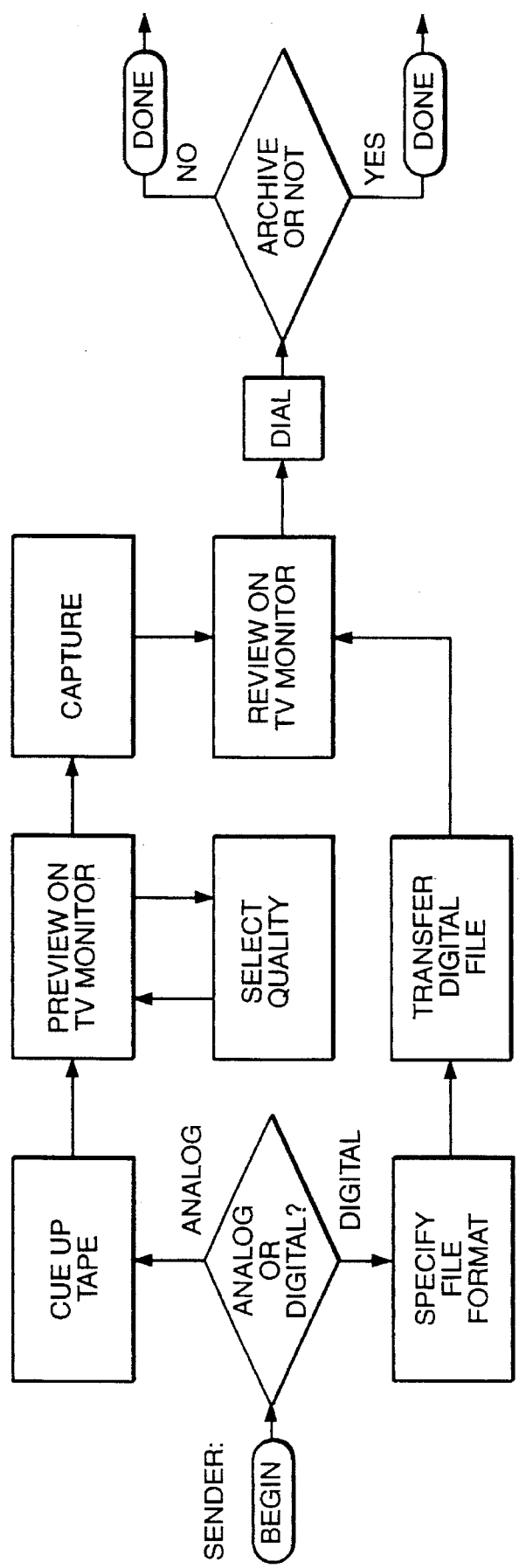
FIG._2A

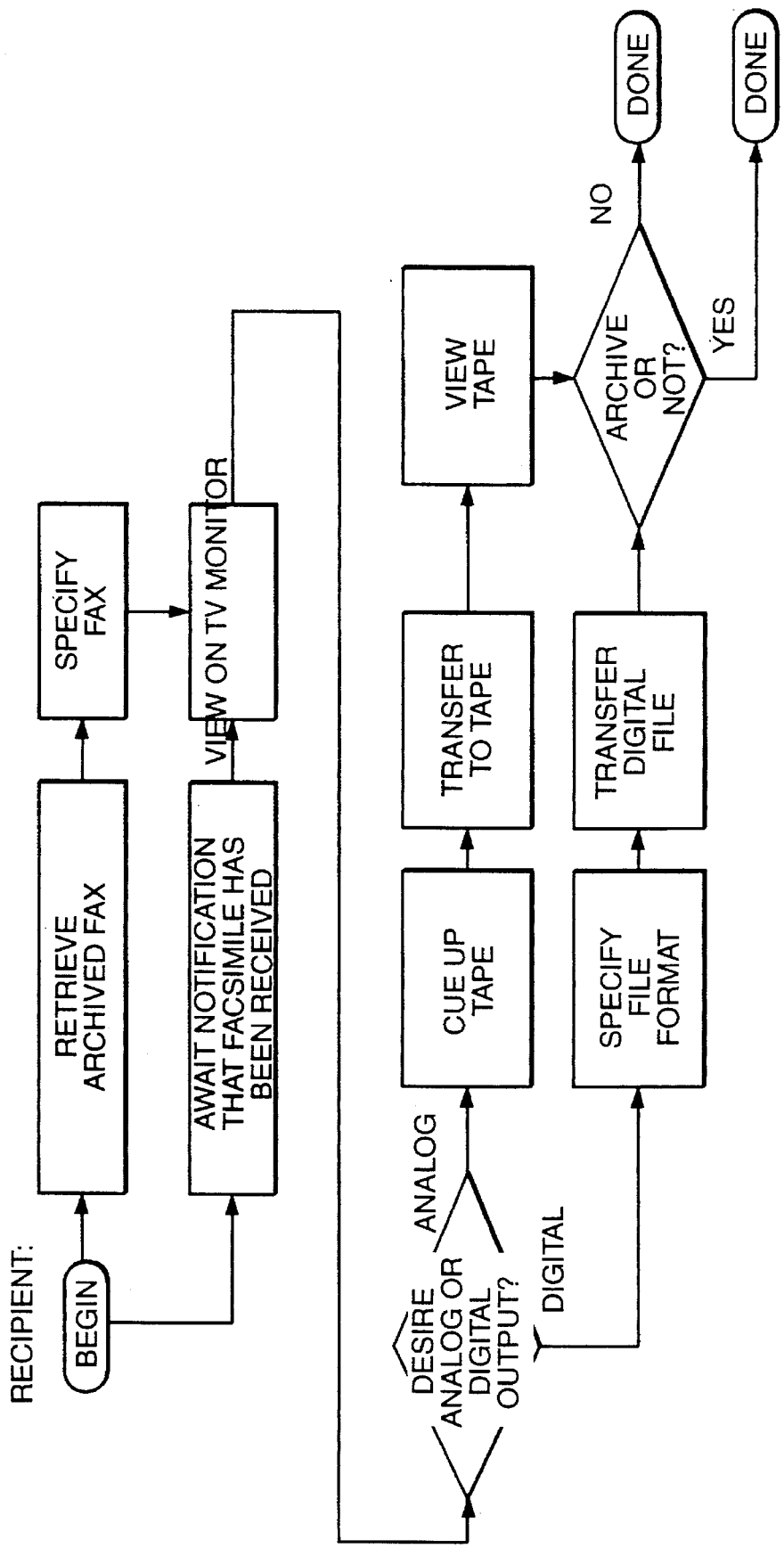
FIG._2B

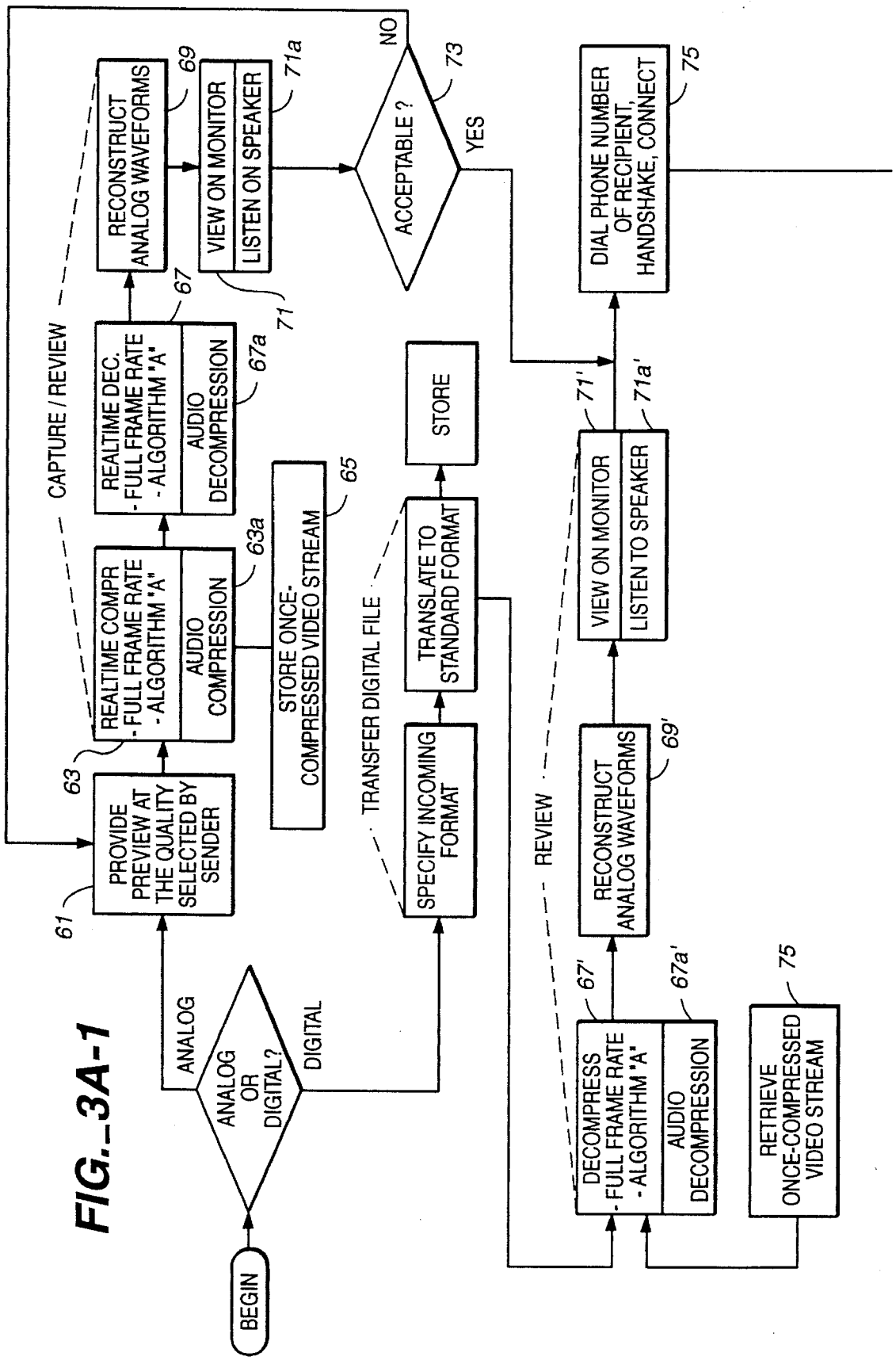
FIG._3A-1

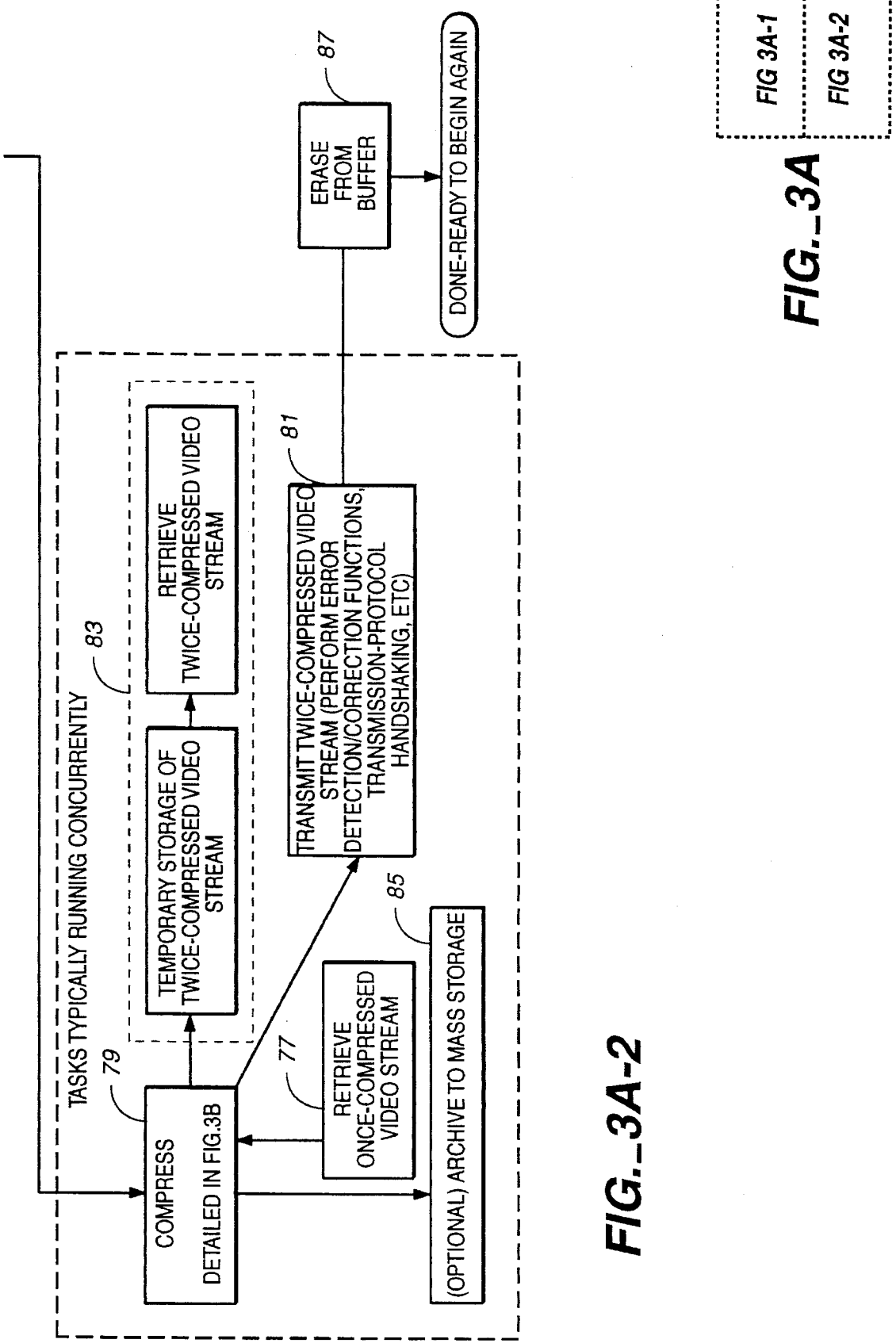

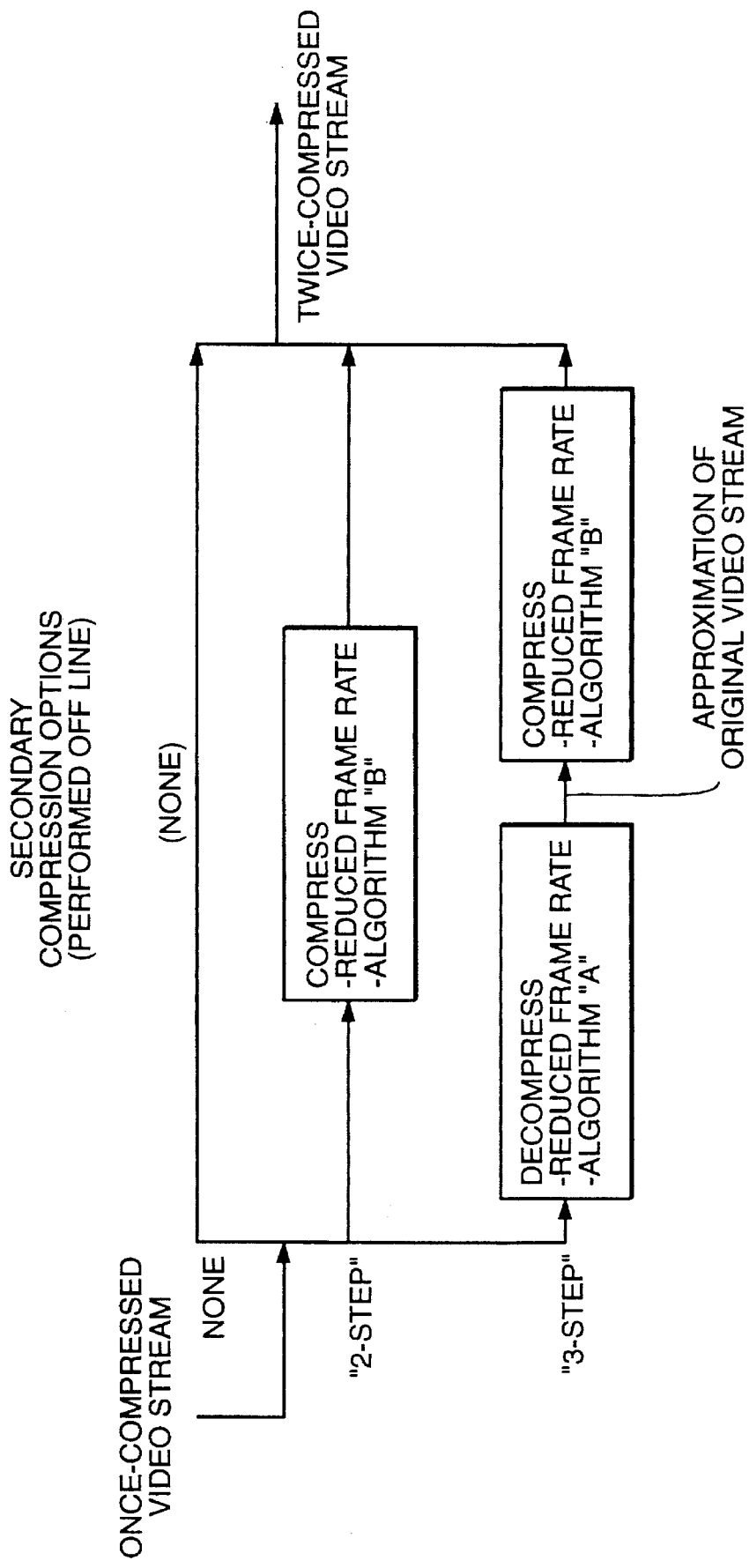
FIG._3B

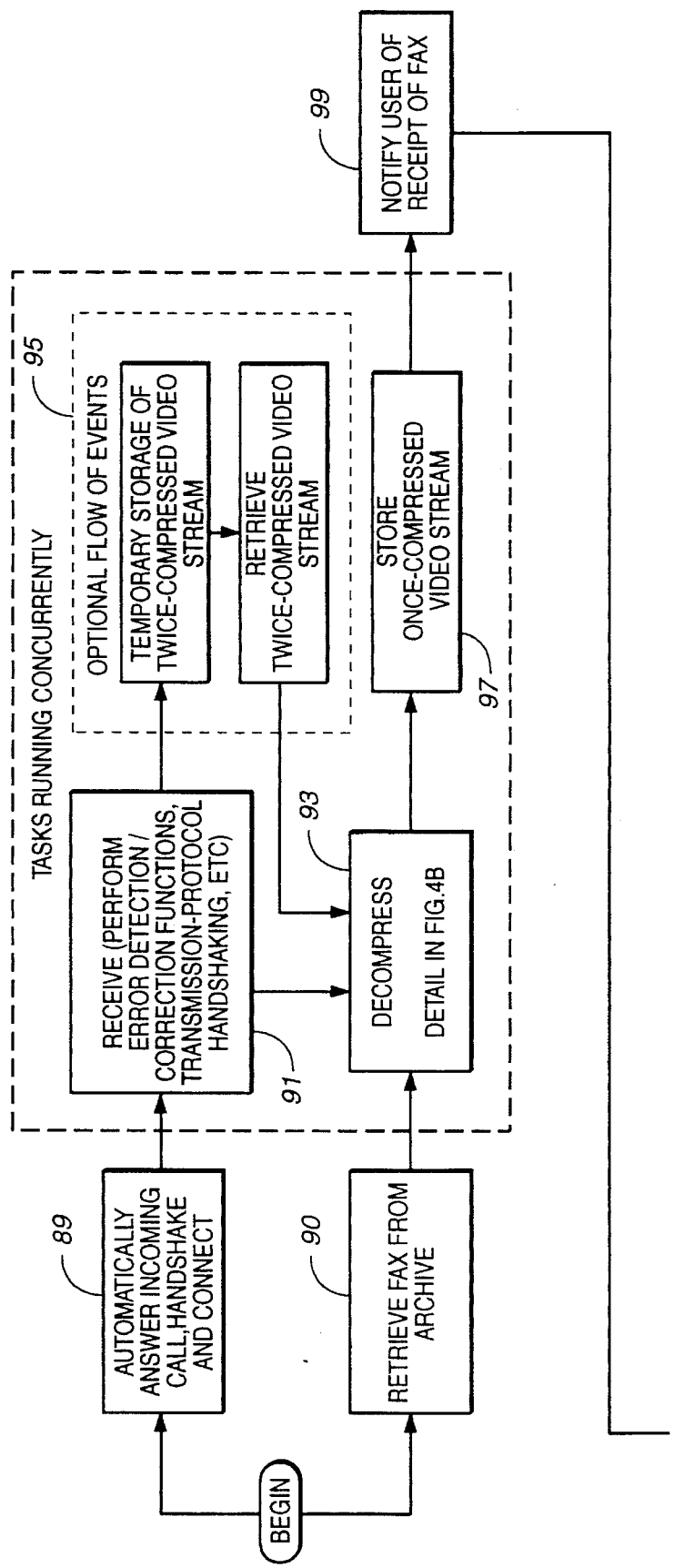

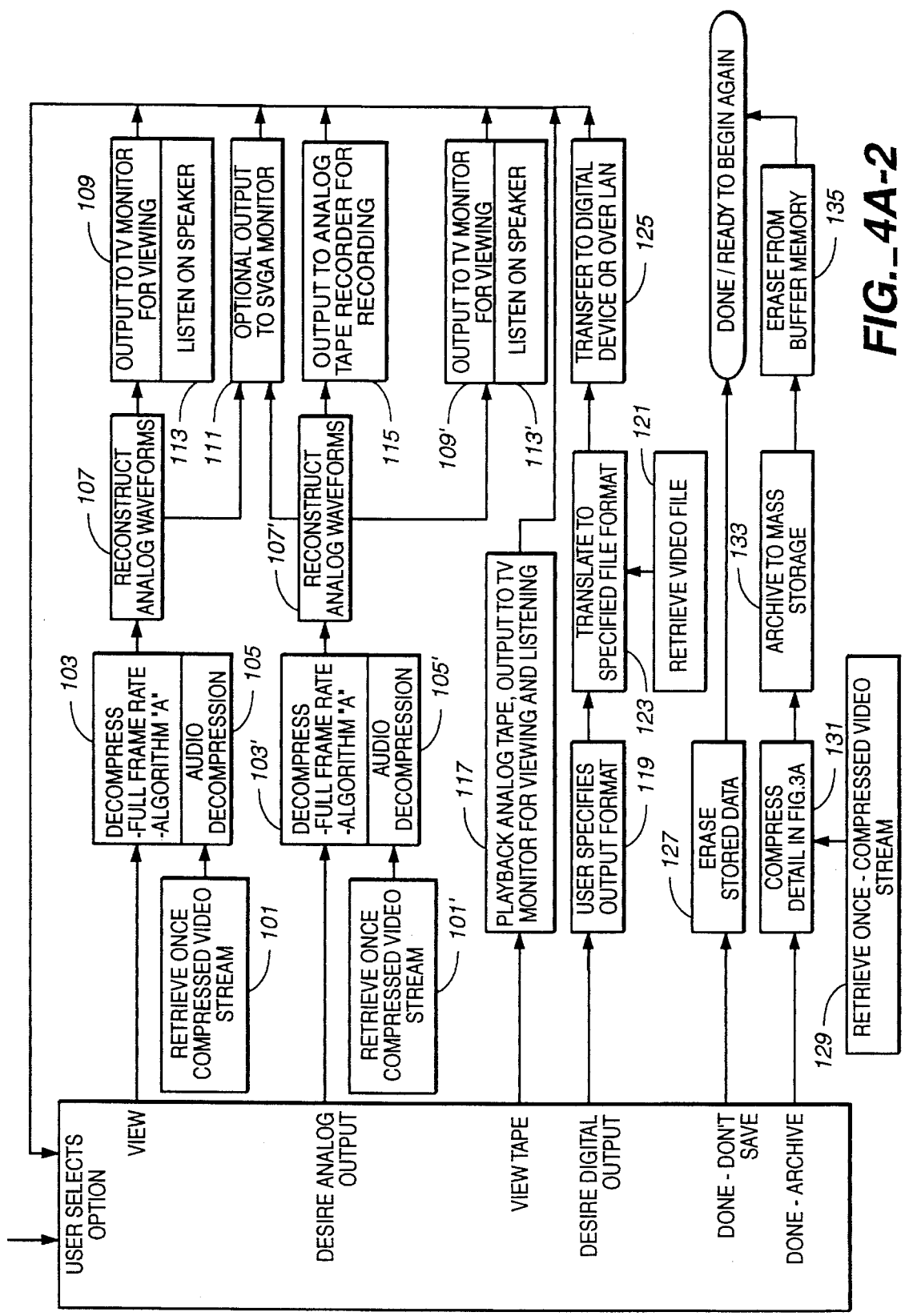
FIG._4A-2

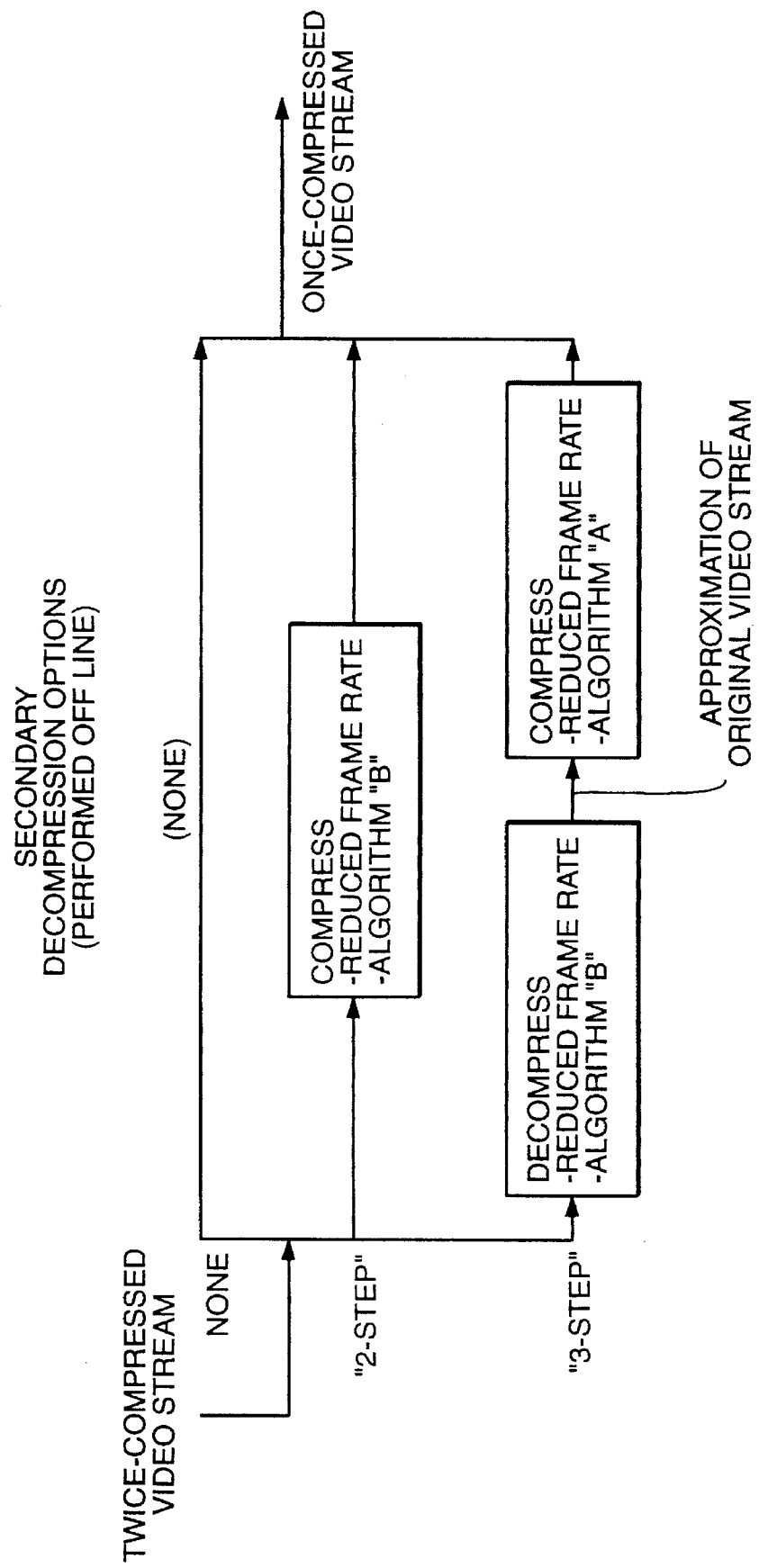
FIG._4B

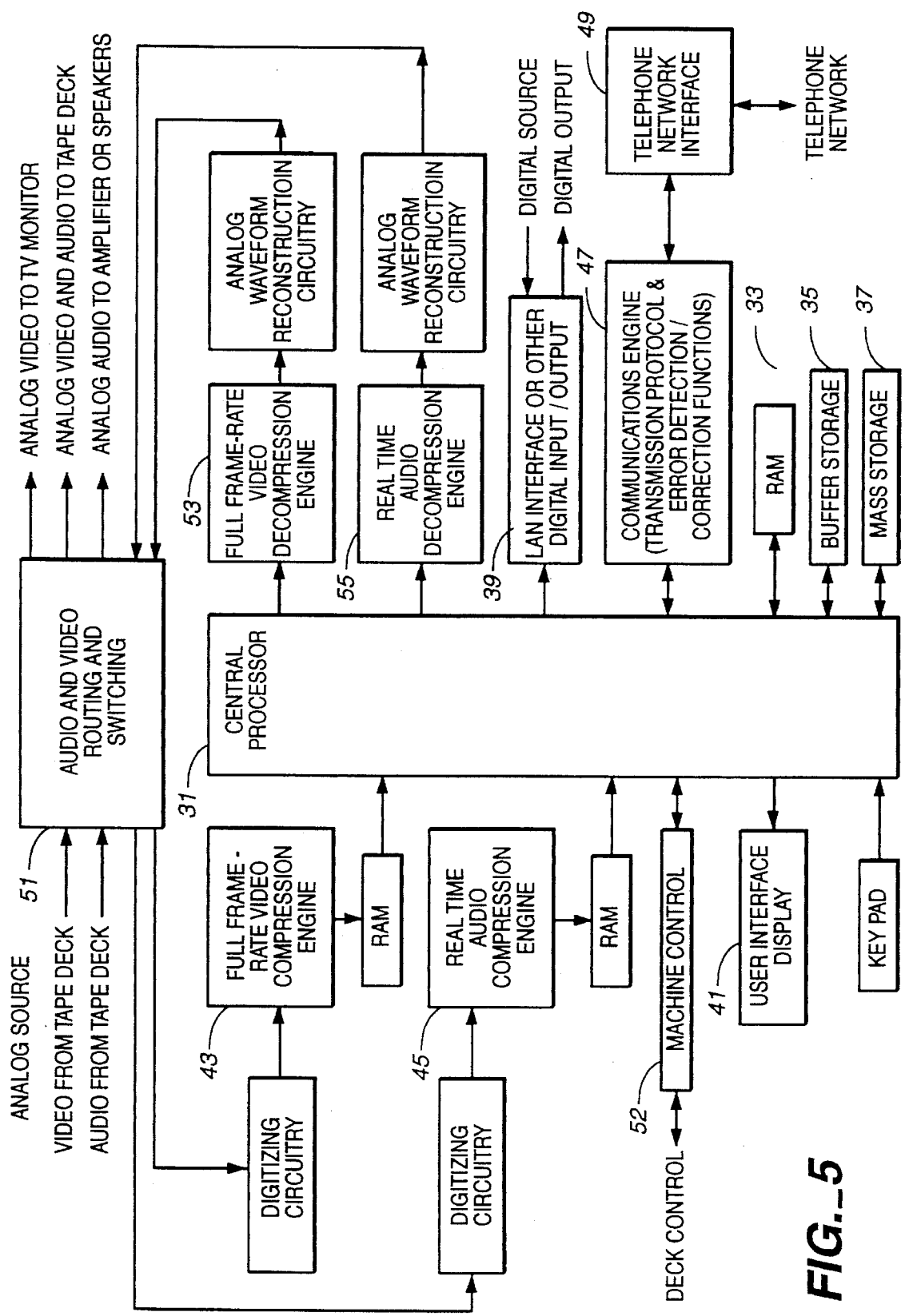
FIG._5

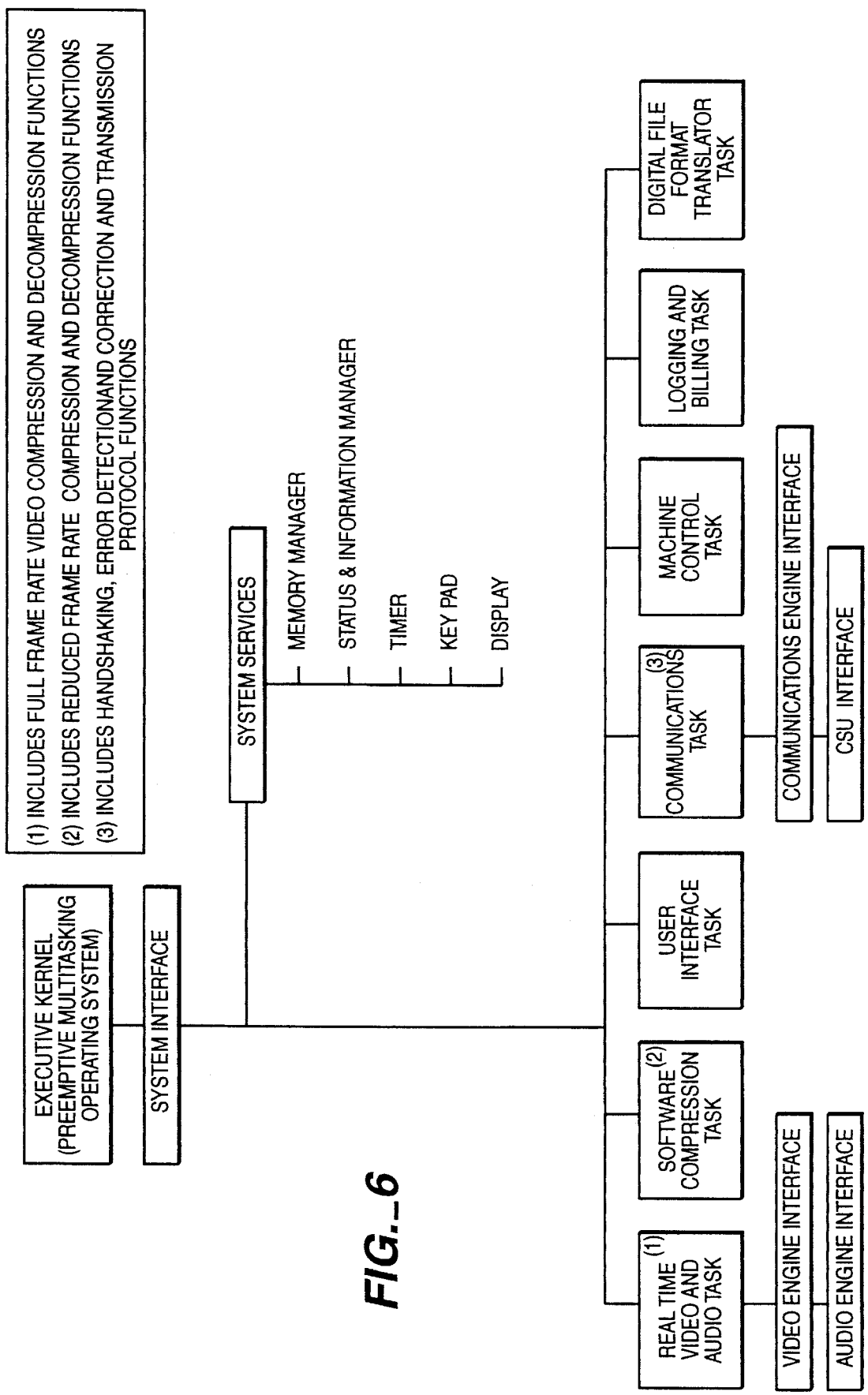
FIG._6

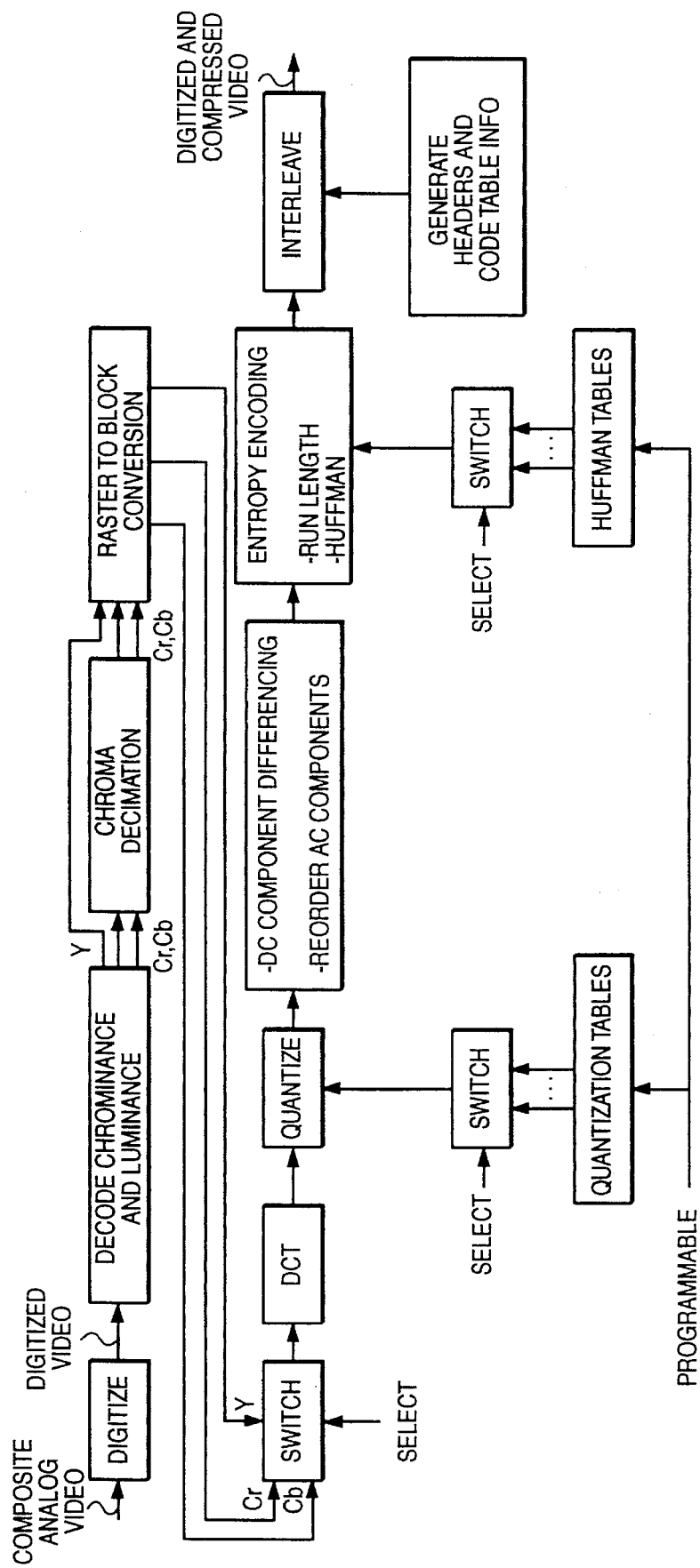
FIG._7A

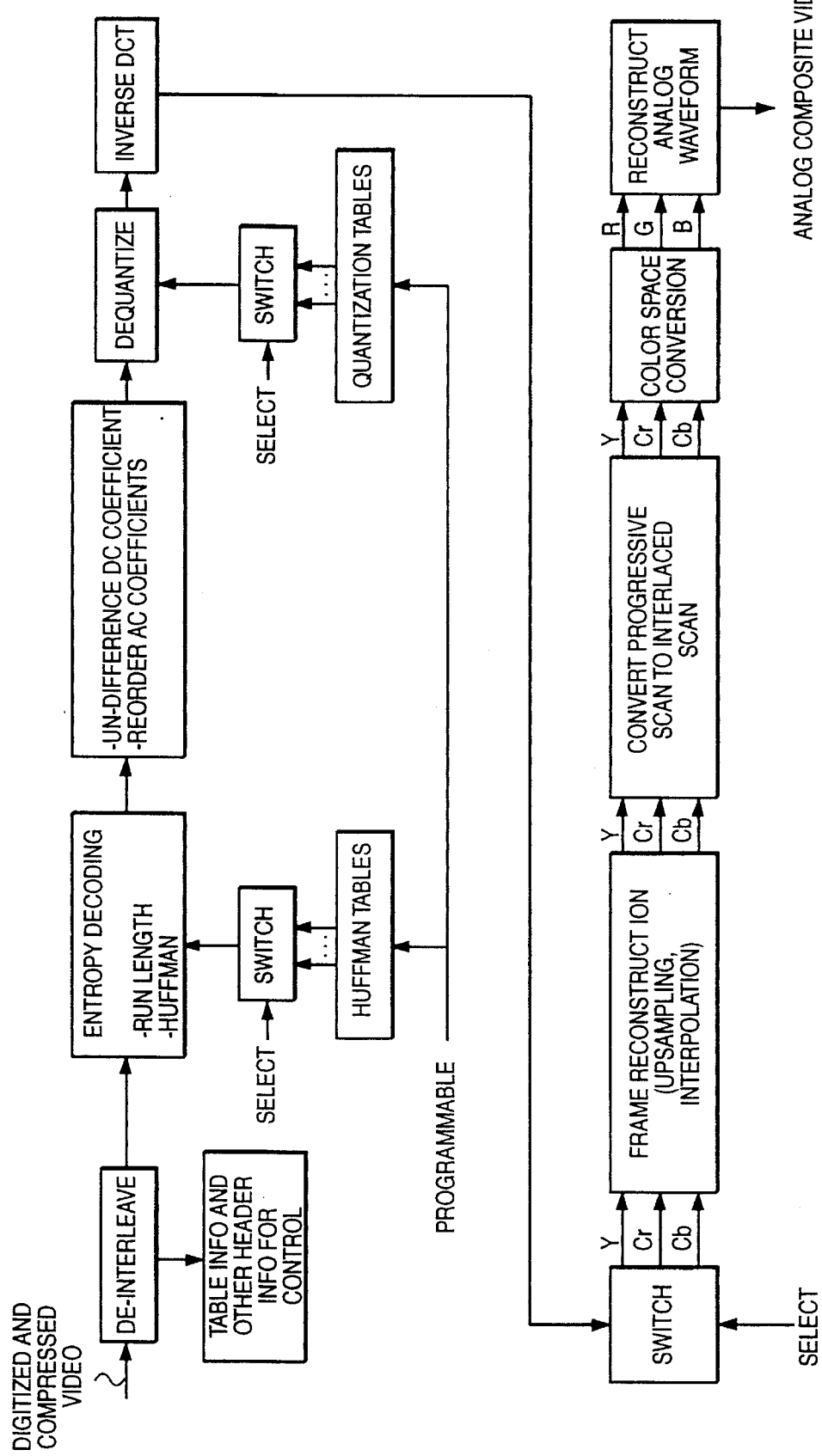
FIG._7B

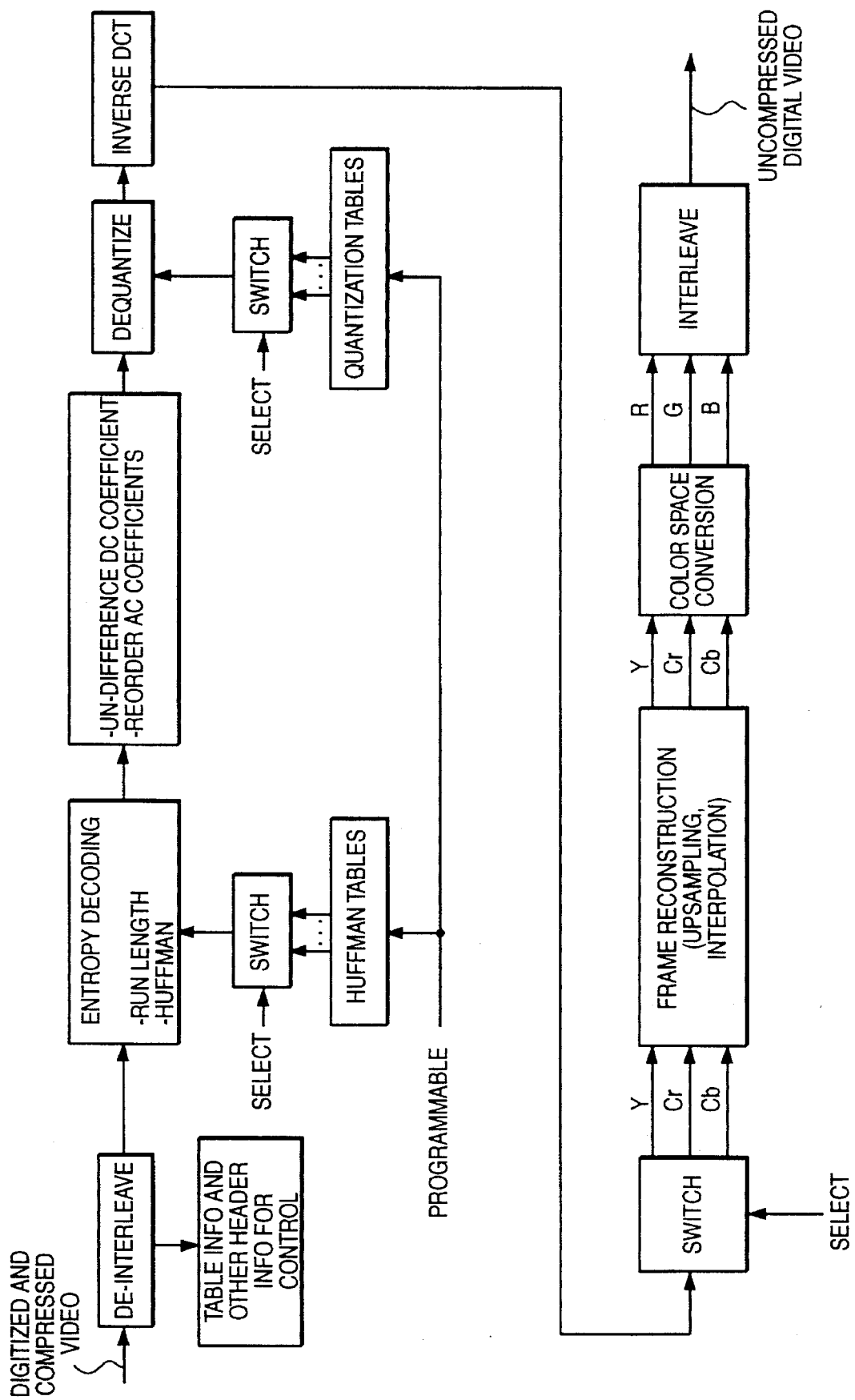
*FIG._8A*

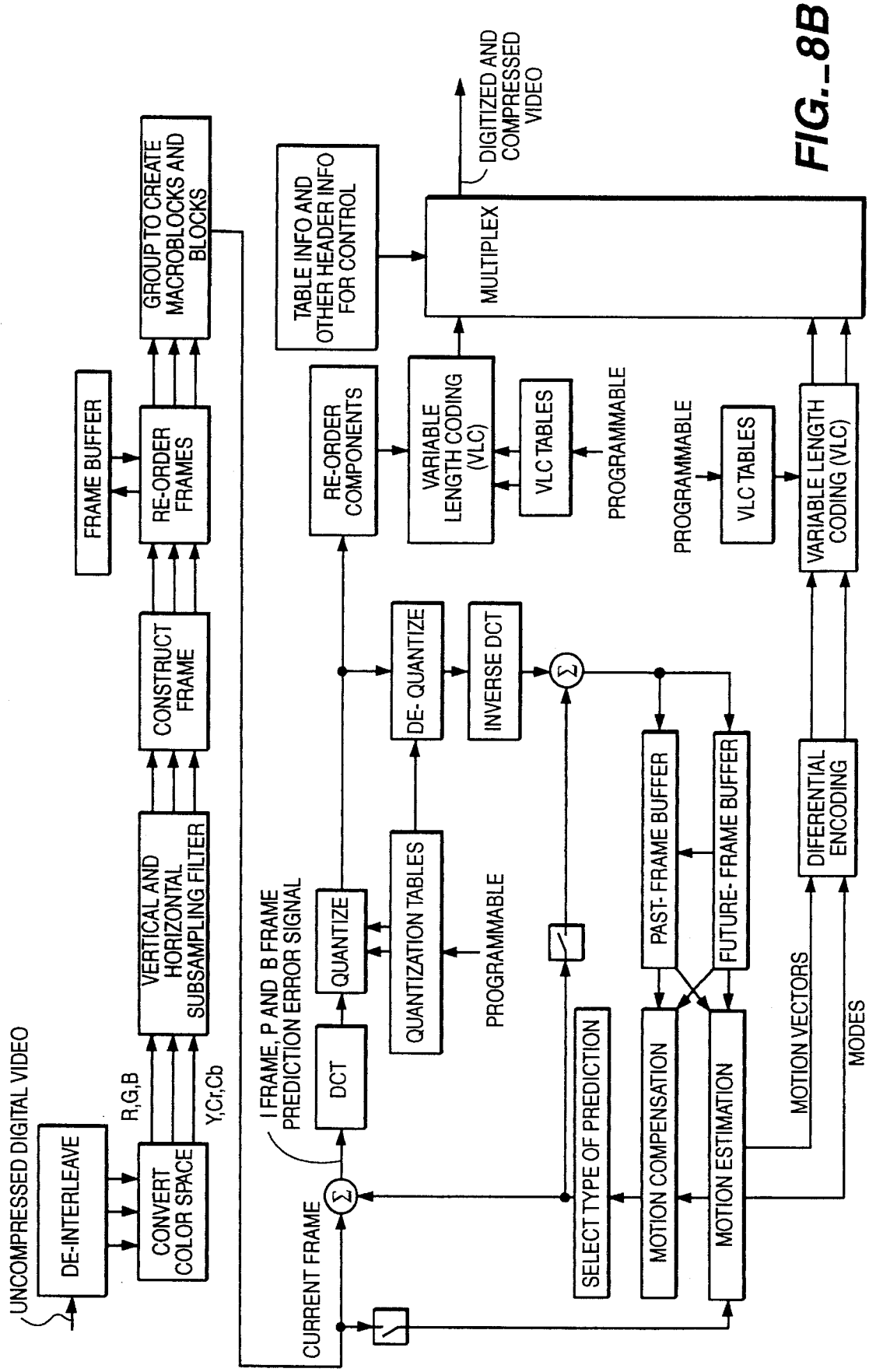
FIG._8B

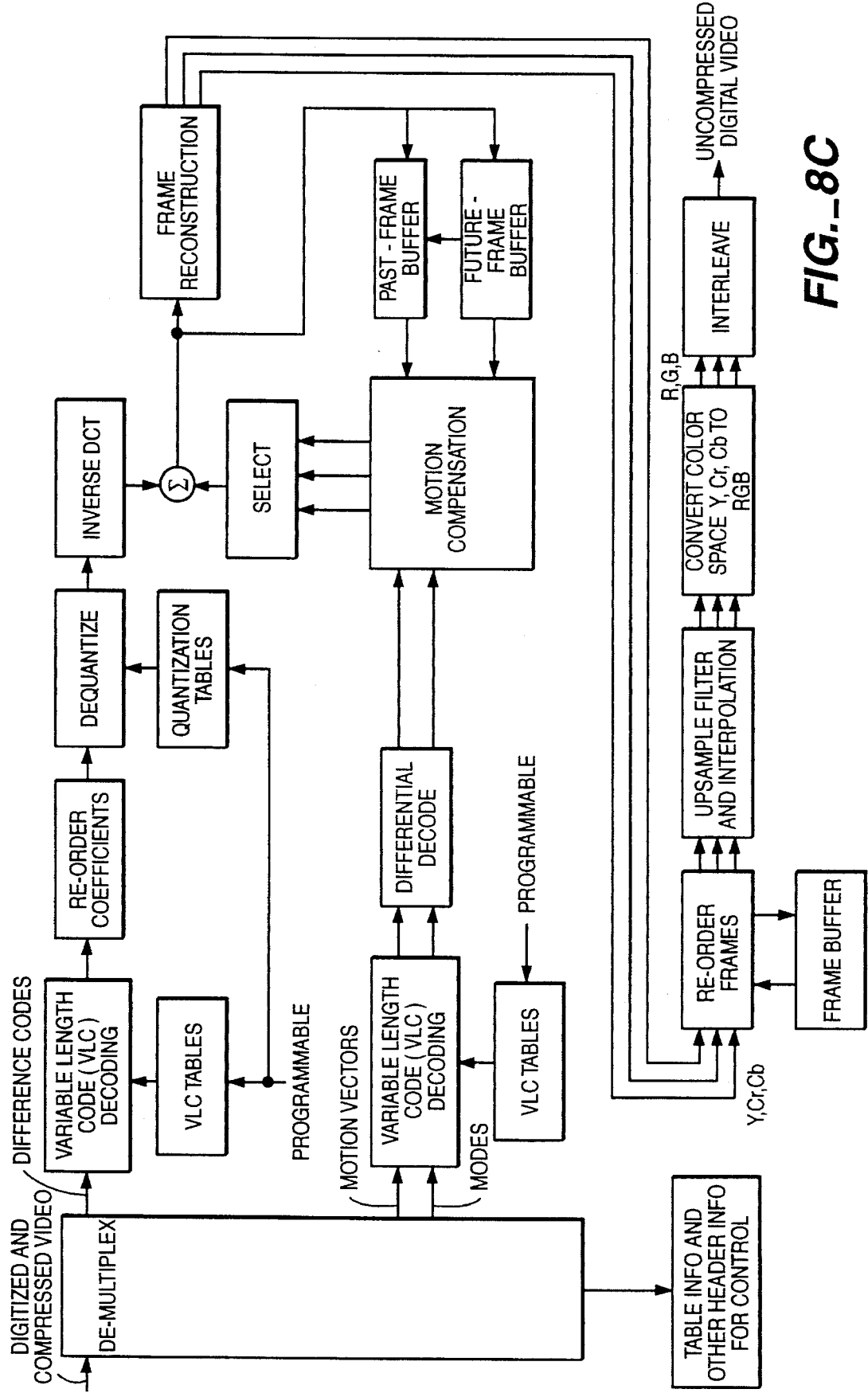
FIG._8C

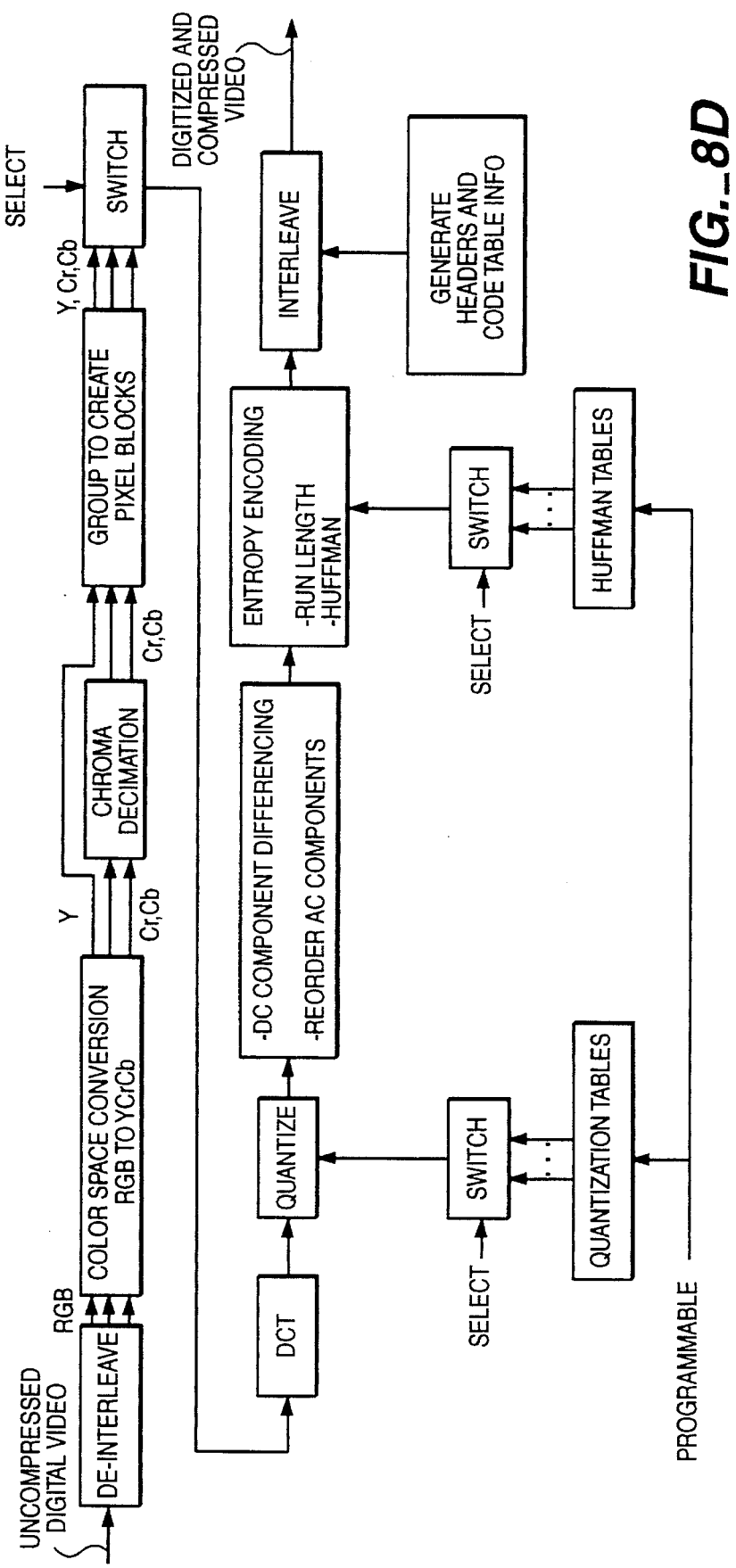
FIG._8D

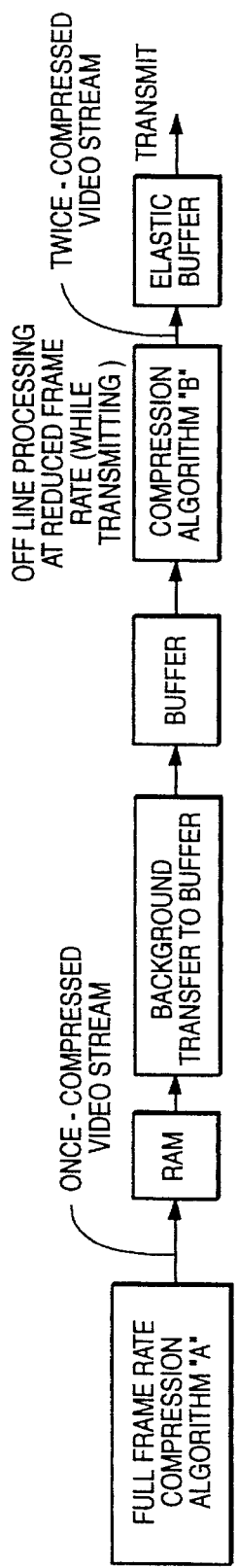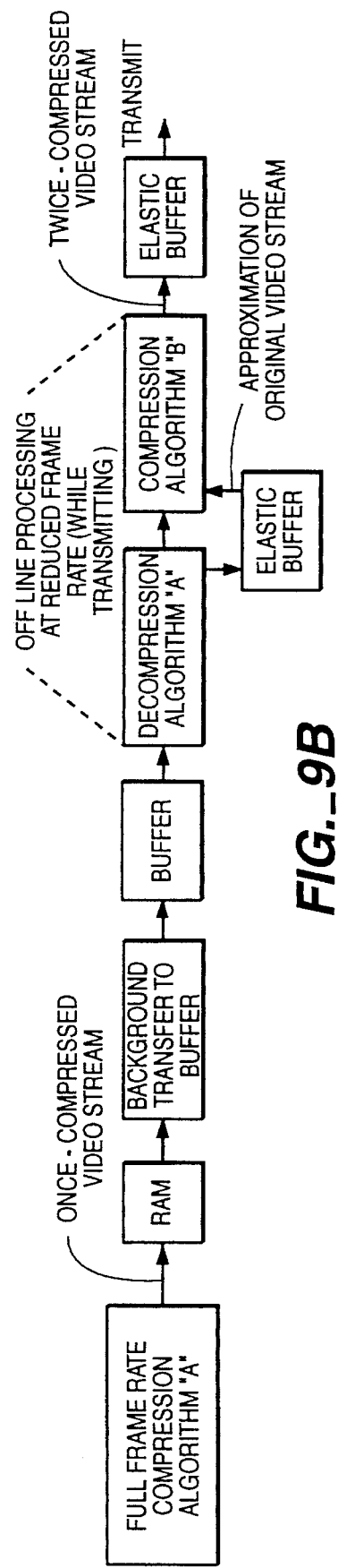
FIG._9A
FIG._9B

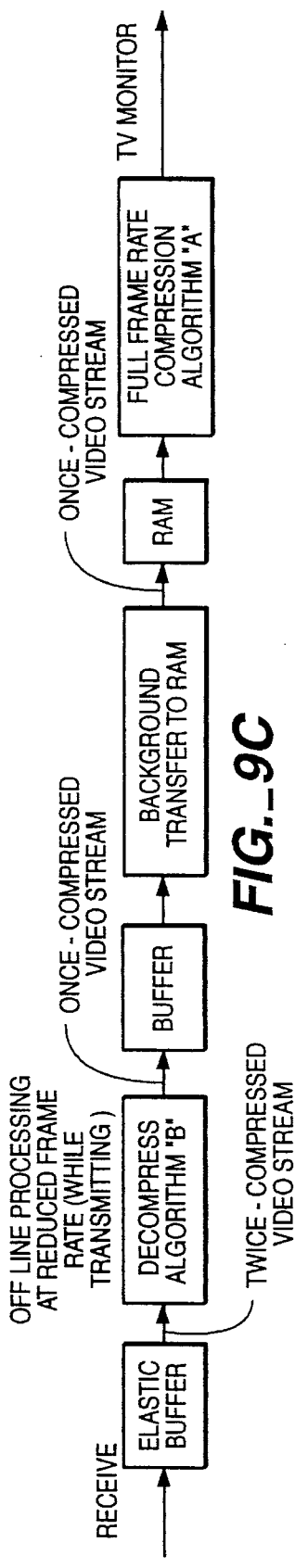
FIG._9C
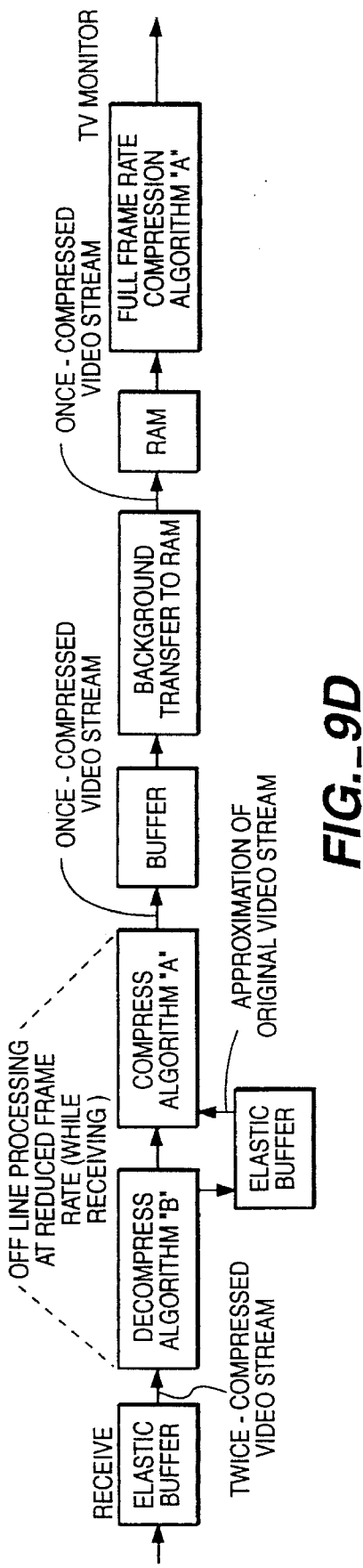
FIG._9D
FIG._9E

SYSTEM AND METHOD FOR TRANSMITTING VIDEO MATERIAL

This application is a continuation, of U.S. patent application Ser. No. 08/077,685, filed Jun. 16, 1993, now abandoned.

BACKGROUND OF THE INVENTION

1. Field of The Invention

The invention relates generally to a system and method for electronically transmitting relatively short segments of full-motion video material from one geographic location to another.

2. Description of Prior Art

Various means of delivering full-motion video material from one location to another are in widespread use. Current methods include the physical delivery of a cassette, analog transmission via dedicated high-bandwidth coaxial cable, digital transmission via high-bandwidth switched fiber channels, transmission via satellite and transmission via radio. Each of these methods has its attendant limitations. Physical delivery of a cassette involves significant time and requires shipping arrangements to be made. High-bandwidth coaxial cable for analog transmission is not switchable or expandable, limiting service to fixed locations, whereas high bandwidth switched fiber channels are expensive and not widely available. Transmission via satellite is expensive and limited to fixed locations. Furthermore, considerable inconvenience is involved in scheduling delivery of the video material to the origination end, and picking up the video material on the receiving end and delivering it to the recipient. In the case of transmission via radio, a limited number of channels are available within the FCC-allocated spectrum, most of which are no wider bandwidth then is offered by the telephone network. Interconnectivity is also limited.

Video material is typically compressed prior to transmission. Current video compression approaches fall into two categories: "real-time" for video conferencing and editing uses, and "very non-real time" for media authoring uses. "Real time" compression and decompression is demanded by video conferencing systems where the total turnaround delay from user number one to user number two and back is critical. This requirement precludes the use of any off-line non-real-time compression methods. "Real time" compression and decompression is also used in all practical editing systems, because (1) of the need to play back at full frame rate randomly selected video segments, and (2) it permits the use of relatively low-cost video tape players which can only record and play back at full frame rate; hence video material must be outputed and digitized at this rate. The same argument is true for decompression and transfer to tape. Examples of this type of video compression are found in U.S. Pat. Nos. 4,843,466, 4,953,196, and 5,062,136.

"Very non-real time" compression refers to the use of a large powerful computer, located in a special facility, where video material is shipped for overnight compression. This is used in the media authoring, or publications market. An example of this type of video compression is found in U.S. Pat. 5,130,792.

Video compression methods may be further categorized in relation to compressed file format. There are two broad categories: "Intraframe" and "Inter-frame" methods, realizing that interframe formats almost always include intraframe elements. "Intraframe" compression preserves the individual frames after compression. This format is the most practical for editing applications where random access to individual frames is critical.

"Inter-frame" compression replaces selected frames with information which represents changes from past and/or future reference frames. Regenerating such a frame on a random access basis, along with the audio segment that goes with it is not easy. Therefore, this method is generally not used for digital editing systems.

Heretofore, there has not been a convenient, inexpensive, readily-available method of delivering relatively short segments of full motion video material from one location to another by electronic means. The present invention addresses this need.

SUMMARY OF THE INVENTION

The present invention, generally speaking, provides a system and method for transferring relatively short segments of full-motion video material from one location to another. In most applications, the material can be of sub-broadcast quality; for many applications, sub-VHS quality is adequate, especially in the instance of a "draft" of the original material being reviewed for the purpose of making editing decisions. However, in most applications, preservation of full motion is essential. Full motion is 30 frames per second (NTSC standard) or 25 frames per second (PAL standard).

In one embodiment of the invention, a video segment is played from an analog video source at a first geographic location and converted into a first video stream. The first video stream is compressed using real-time video compression to produce a compressed video stream. The video segment is displayed and, based on display of the video segment, at least a portion of the video segment is selected. A once-compressed video stream consisting of a portion of the compressed video stream corresponding to the portion of the video segment selected is then transmitted through a telephone network from the first geographic location to the second geographic location, and received at the second geographic location.

In another embodiment of the invention, at a first geographic location, a video file is accepted from an external source. A once-compressed video segment is retrieved to produce a compressed video stream. The compressed video stream is transmitted through a telephone network from the first geographic location to the second geographic location and received at the second geographic location.

BRIEF DESCRIPTION OF THE DRAWINGS

The invention may be understood from the following description in conjunction with the appended drawings. In the drawings:

FIG. 1 is a block diagram of a complete video facsimile ("fax") system with one video fax unit configured as a sending unit and another video fax unit configured as a receiving unit;

FIG. 2A is a diagram of the operation of the system of FIG. 1 from the perspective of the sender;

FIG. 2B is a diagram of the operation of the system of FIG. 1 from the perspective of the recipient;

FIG. 3A is a diagram showing in greater detail certain aspects of the operation of the system depicted more generally in FIG. 2A;

FIG. 3B is a diagram showing in greater detail the compression operation of FIG. 3A;

FIG. 4A is a diagram showing in greater detail certain aspects of the operation of the system depicted more generally in FIG. 2B;

FIG. 4B is a diagram showing in greater detail the decompression operation of FIG. 4A;

FIG. 5 is a block diagram of a preferred embodiment of a video fax station in accordance with the invention;

FIG. 6 is a block diagram of the software elements of the video fax station of FIG. 5;

FIGS. 7A and 7B are more detailed diagrams of full frame rate compression and decompression, respectively;

FIGS. 8A and 8D are more detailed diagrams of reduced frame rate decompression and compression, respectively, using a first algorithm (algorithm "A");

FIGS. 8B and 8C are more detailed diagrams of reduced frame rate compression and decompression, respectively, using a second algorithm (algorithm "B");

FIGS. 9A and 9B are dataflow diagrams of two-step compression and three-step compression, respectively;

FIGS. 9C and 9D are data flow diagrams of two-step decompression and three step decompression, respectively; and FIG. 9E is a data flow diagram of archiving.

DETAILED DESCRIPTION OF THE PREFERRED EMBODIMENTS

Referring to FIG. 1, the complete video fax system 10 utilizes two video fax units, configured as a sending unit 11 and receiving unit 13, respectively. The units 11, 13 provide digital data communications across a telephone network 15. When configured as a sending unit, the video fax unit 11 is operated in conjunction with an analog video source 17, such as a video tape recorder, or alteratively with a digital data source 19 such as a digital tape recorder or computer network. When configured as a receiving unit, the unit 13 operates in conjunction with an analog recording device 21, such as a video tape recorder, or alteratively with a digital storage medium 23 such as a digital tape recorder or computer network.

In the preferred embodiment, a single design unit performs both the sending and receiving functions.

The analog video source 17 preferably produces a standard commercial television broadcast signal such as NTSC or PAL.

The digital data source may be any of several standard digital video formats such as Video for Windows® (Microsoft) or QuickTime® (Apple). Other non-standard and forthcoming digital video formats are also anticipated and could be supported.

The telephone network 15 provides bidirectional communication between the pair of video facsimile units 11,13. The forward data path, from the sending unit 11 to the receiving unit 13, provides for transmission of compressed digital video and audio, facsimile summary information, and network and user information. The reverse data path, from receiving unit 13 to sending unit 11, provides for the transmission of status, and network and user information.

Facsimile summary information includes elements such as the name and telephone number of the sender; the time and date of transmission; the length, nature, and parameters of the compressed video facsimile; and estimates of transmission and processing time.

Status transmitted from the receiving unit back to the sending unit includes elements which indicate the receiving unit's capacity to receive video facsimiles, including information regarding software versions, algorithm support, available storage, and in-use status. Among other things, this information enables the sending unit to determine whether a facsimile transmission should proceed. During transmission, status information includes reports of transmission errors and requests for retransmission, and notice of unusual events such as user cancellation. At the end of transmission, status includes confirmation of video facsimile receipt.

Network and user information includes elements such as a directory of video facsimile users, software update notices, and other items of general interest. Selected video facsimile machines, configured as network masters, may contain special features for dissemination of network information.

Transmission protocol information includes the necessary handshaking between the units 11,13 as well as to the telephone network 15 for such things as dialing, connecting and disconnecting.

Referring to FIG. 2A, the first step a user takes to transfer a video facsimile is the selection of source media as analog or digital. Assuming analog media is selected, the user loads his analog media, such as a video tape, into his playback device, such as a VCR. The source material is presented on a TV monitor allowing the user to search for and cue his video sequence. The image appearing on the monitor is an approximation of the facsimile as it will ultimately be received, allowing the user to select a transmission quality setting which provides adequate video fidelity, but minimizes transmission time.

When the desired video sequence ("clip") begins, the user pushes a button to commence video "capture"—the process of digitizing, compressing and storing the resultant digital video in the unit's memory—and pushes a button again to stop capture. The user may optionally review the sequence to ensure that the sequence was properly captured, reviewing whether video quality is as expected and whether the sequence is captured in its entirety without accidental clipping of the beginning or end. Then the user proceeds to the transmission step, by either dialing a phone number or selecting a number from a supplied list. After dialing, the remaining steps of connection and transmission occur automatically, but the user may monitor the unit to ensure that connection is established, e.g., that the receiving unit isn't busy servicing another call, and that the facsimile is sent successfully without incident.

If a digital source is selected, the user enters information indicating where the source material is located (e.g., a network file-name) and indicates the file format of the digital data. If the digital file format is supported, the video sequence can be reviewed on the TV monitor. If the digital file format is not supported, the unit will still be able to send it, but the user will not be able to review it. Then, the user proceeds to dialing as described above.

As shown in FIG. 2B, at the receiving end, an audible or visual signal indicates the receipt of a video facsimile. The user normally will review the received facsimile on a TV monitor or, alternatively, on an SVGA computer screen, and then transfer the facsimile to an analog or digital media, in the latter case specifying file-format. Typically, in the analog case, the user will then proceed to play back the tape to verify proper transfer of the fax to the tape. After the facsimile is transferred to the users satisfaction, the user has the option of deleting the facsimile or requesting the storage of the facsimile in a video archive for future use.

It should be noted that these are the common sequences that the user will follow. However, the user has the option of viewing a captured fax an unlimited number of times; he has the option of transferring a received fax to analog tape multiple times (for example to make multiple copies for use at the recipient's facility); he can archive and retrieve a particular fax an unlimited number of times.

Provision is made for the receipt of multiple faxes during periods of unattended operation. If more than one facsimile is present, the user will be prompted to select the facsimile to be reviewed and transferred, deleted or archived.

Referring to FIG. 3A, the process of capturing and transferring a video facsimile consists of three steps: capture and review of a video clip, dialing and connection, and secondary processing and transmission.

The step of capture and review differs depending on the selection of an analog or digital source. In the case of an analog source, the unit goes into a preview mode (61), wherein the video sequence is captured, compressed in real-time, and decompressed in real-time for simultaneous monitoring by the user. Because the video displayed to the user and audio played back to the user have been digitally processed, the video and audio fidelity will roughly match that of the ultimate video facsimile, and the user can subjectively assess this fidelity, changing processing parameters as necessary.

When the user begins capture of the clip, the real-time compression, decompression and display of the source material continues, but in addition, the compressed digital video and audio data is saved to buffer memory within the unit. If the user requests review of the clip, stored digital video and audio data is retrieved, decompressed and displayed in real-time.

More particularly, during capture, the video sequence is compressed in real time (63) at the full frame rate using, typically, an intraframe compression algorithm (for example, JPEG). This type of compression algorithm is referred to hereinafter in the description and the figures as algorithm "A". At the same time, audio compression is performed (63a), and the once-compressed video stream (with audio) is stored (65).

Review continues during capture by performing the inverse process on the once-compressed video stream, i.e., real time video (algorithm "A", block 67) and audio (67a) decompression, followed by reconstruction of the analog video and audio waveforms (69), which are presented to the user by a monitor (71) and speaker (71a). If the user is not satisfied with the clip, having seen how it will appear to the recipient, the user may press a button or otherwise indicate to the video fax unit that the clip is not acceptable (73), whereupon the capture and review process is repeated.

The capture and review process continues until the user is satisfied with the clip. Then, based on a telephone number entered or selected by the user, the machine initiates dialing (75) through commands to the telephone network interface. When a connection is established, the unit proceeds to the secondary compression and transmission phase of operation.

In the case of a digital source, the procedure within the sending unit is similar, however the preview and capture steps are eliminated, since the digital data comprises the complete video sequence. The sequence can be reviewed prior to sending (steps 67', 67a', 69', 71' and 71a '), but only if the digital file format utilizes video and audio compression which the unit is capable of decompressing and displaying at full frame rate. This capability is useful but not mandatory, because the existence of digital source material usually suggests that other systems are available to edit and review such material.

Also, an analog video sequence that has been previously captured and achieved to mass storage can be reviewed at any time by first retrieving the once-compressed video stream (75) and then performing the operations of blocks 67', 67a', 69', 71' and 71a'.

In the secondary compression phase, secondary compression is used to reduce the volume of data comprising the video content of the clip. The video content is typically 2–20 times larger than the audio content, so processing effort is best spent on reducing the video content. Two secondary processing options are available, or secondary processing can be bypassed. Bypassing of secondary compression is most applicable for very short clips, or for clips where the highest video fidelity is required and ample transmission time is available.

Assuming that secondary compression is not bypassed, the once-compressed video stream is retrieved and again compressed (79) to produce what is referred to herein as a "twice-compressed" video stream, i.e., a video stream that has undergone two compression processes and typically experienced some loss of detail during each of the compression processes. As described below, however, the second compression process does not necessarily act directly on the output of the first compression process. In other words, a "twice-compressed" video stream is not necessarily doubly small, but has been through two compression operations.

As secondary compression is being performed, the twice-compressed video stream may be immediately transmitted (81). That is to say, decompression of the video stream and compression of the video stream may be performed concurrently to minimize storage requirements for storing the approximation of the original video stream resulting from the decompression. During transmission, error detection/correction and transmission-protocol handshaking are performed. Alternatively, the twice-compressed video stream may be temporarily stored and later retrieved for transmission (83). Later transmission may be necessary, for example, if the called telephone number is busy, or may be desirable, for example, to take advantage of a low-rate period of the telephone network. Like conventional paper fax machines, the video fax station is preferably capable of receiving faxes unattended, such that transmission may be scheduled to occur late at night, for example. Optionally, the twice-compressed video stream may be archived to mass storage (85).

At the conclusion of the secondary compression/transmission phase, the video sequence is erased from buffer memory (87), and the sending unit is ready to begin again.

As shown in FIG. 3B, one option for secondary compression is to further process the compressed video data that was generated during capture and full-frame rate compression, resulting in a "2-step" overall compression process. This approach is applicable when the overall compression processing can be bifurcated into two phases, one performed in real-time at full-frame rate during capture, and one performed at reduced frame rate, where the second phase directly adds further compression.

The second option for secondary compression allows for partial or complete decompression of the video data generated from the real-time compression prior to performing the secondary compression. This approach offers greater flexibility, because some algorithms useful for real-time compression do not yield a data representation suitable for additional compression. For example, a typical real-time video compression algorithm utilizes a spatial transform, followed by quantization and statistical processing. After statistical processing, the entropy of the digital data is nearly optimized, so secondary compression using simple statistical techniques will not further reduce the volume of data. However, if the image is partially decompressed, the transform coefficients can be re-quantized using a different quantization table which results in more compression.

More generally, the original (uncompressed) video sequence can be reconstructed, and secondary compression performed using an algorithm which is independent of the algorithm used for real-time compression. The reconstructed video sequence will be an approximation of the original, due to the lossy (and hence irreversible) processes utilized during real-time compression. The degree of approximation and the type of resulting image artifacts will combine with those generated during secondary compression to influence the final image quality.

In the preferred embodiment, real-time compression utilizes a frame by frame technique wherein each frame is individually compressed; however, secondary compression is performed on a multiple frame basis. The multiple frame compression algorithm requires an accurate approximation of the original (uncompressed) video sequence, so the first step in secondary compression is to reconstruct the original video sequence using the same decompression algorithm used for real-time compression.

The two stage processing technique (real-time followed by secondary compression) enables the video-facsimile unit to deliver, in the same transmission time, much higher quality images when compared to a system of comparable complexity which performs all compression/decompression in real-time. It also provides the means to send images which have the same quality as a real-time system in less time. And, when compared to a unit which has comparable image quality and transmission time, but uses only real-time techniques, it is much simpler and less expensive to manufacture. These benefits are realized by two key features of the secondary compression: First, it is performed at a reduced frame-rate, in software running on a general purpose processor, without the need for custom processing hardware. Second, it is performed concurrently with the transfer of the clip over the telephone network and its computation time is matched to the transmission time. These points are elaborated on below.

Real-time, full-motion compression must operate at 30 frames per second (NTSC, 25 frames per second for PAL), while secondary compression implemented almost entirely in software using current technology typically operates at 1.5 to 2 frame per second. The reduced processing throughput rate enables the use of a more complex multi-frame video compression technique capable of generating facsimiles whose video fidelity for a given volume of data per frame far exceeds that achievable using only frame-by-frame compression techniques. Furthermore, with current low-cost technology, the multi-frame technique cannot be performed in real-time. At such time that the multi-frame technique can be performed in real-time, it will likely require specialized hardware. The two-stage processing technique outlined here, by contrast, is able to perform the same level of compression at the same fidelity with lower cost hardware; in the preferred embodiment, compression is performed entirely in software on the general purpose processor with no additional special purpose hardware.

A highly compressed video clip of "good" quality at full motion, transmitted over an existing narrowband digital telephone network, will result in a transmission time of 20–60 seconds per second of video material (length of the clip). This order of magnitude difference creates the opportunity to perform secondary compression in a length of time commensurate with the transmission time; by performing the processing concurrently with the transmission, it will add virtually no time to the overall transmission, and go unnoticed by the user. The secondary compression can run as slow as approximately 1 frame per second without taking longer than the transmission time. This moderate rate may be satisfied even using some of the more complex algorithms, which can be computed in software at rates of 0.5–2 frames per second.

Tradeoffs can be made in the selection of image quality and transmission time, which fortuitously exhibit a complementary relationship. The selection of image quality affects the parameters of both the real time and secondary compression. If the user selects a high quality, the result will be a larger data file. This results in longer transmission time, which provides the longer time window required by the secondary compression processing to generate the higher-quality image. If the user selects a low quality, the result is the opposite. A property of compression algorithms implemented in software is that it takes more processing time to generate a higher-quality compressed image than a lower-quality one, for the same resulting data-file size. The lower quality one can be arrived at by simply discarding more of the original picture content, which requires little in the way of computation.

When secondary compression is utilized, the intermediate frame size does not determine transmission time as it does when only real-time compression is employed. Instead, intermediate frame size is determined by the needs of the secondary compression algorithm. By using larger intermediate frame sizes, computation of the secondary algorithm will result in a better image; the artifacts of the real-time compression will not significantly contribute to the final image quality.

The ratio between final and intermediate frame sizes (under the headings "with secondary compression") does not necessarily represent the compression ratio achieved with secondary compression. Rather, some of the reduction is by throwing out data (via proper selection of quantization table values) after such critical decision making, such as motion estimation, is completed. Typical numbers are shown in Table 1 below for the case of a narrowband digital telephone network (the preferred embodiment), illustrating how secondary compression results in faster transmissions for the same image quality.

TABLE 1

| User Selected Quality | Intermediate Frame Size | | Final Frame Size | Transmission Time For Narrowband | | Secondary Processing Frame Rate | Complexity of Secondary Compression Computations |
| --- | --- | --- | --- | --- | --- | --- | --- |
| | Without Secondary Compression | With Secondary Compression | | Without Secondary Compression | With Secondary Compression | | |
| very high | 50 k | 90 k | 25 k | 214 | 107 | 0.3 fps | very high |
| high | 25 k | 60 k | 10 k | 107 | 43 | 0.7 fps | high |
| good | 14 k | 45 k | 7 k | 60 | 30 | 1.0 fps | moderate |
| low | 9 k | 45 k | 4 k | 38 | 17 | 1.8 fps | low to moderate |

"Intermediate frame size" is average frame size in bytes per frame, after real-time compression.
"Final frame size" is average frame size in bytes per frame, after secondary compression; average is over groups of frames.
"Transmission time" is in seconds per second of source material for NTSC (30 fps).
"Narrowband" refers to 56 kbit per second digital telephone network.

Ideally a balance is achieved between the transmission rate and the secondary compression processing rate. Taking as an example the first line of Table 1, if secondary processing could be done at a faster rate (e.g., due to a faster processor) than 0.3 fps, say 0.5 fps, then the secondary processing would be completed prior to transmission being completed. A better balance would be achieved if the secondary processing was tasked to generate a slightly smaller frame size, say 20k average size instead of 25k. For the same quality image, this would increase the computation time, slowing down the rate to say 0.4 fps, which better matches the transmission rate of 20k frames at 0.35 frames per second. The benefit to the user is overall faster transmission. This may be implemented by adaptive techniques which would automatically adjust parameters within the secondary compression algorithm.

In most cases, secondary compression is available on digital source files, utilizing only the two secondary steps of the "3-step" compression processing, where the first stage consists of decompression of the digital source using an appropriate algorithm, and where the second stage of processing utilizes the same multi-frame algorithm used for analog source media. Because decompression of the digital source file is performed in software, a number of "drivers" supporting widely varying digital file formats may be readily provided.

There will be instances where the secondary compression is not performed concurrently with the transmission. For example, if the receiver's phone circuit is busy, the sending unit may go ahead and perform the compression, temporarily storing the twice-compressed video steam. Later, when the phone circuit is available, the transmission will commence. There is also the case where the transmission commences after the secondary compression has begun, but prior to it being completed. This case is simply handled by concurrently continuing to store and retrieve the twice-compressed video stream while also compressing and transmitting.

When secondary compression and transmission are complete, the sending unit exchanges additional information with the receiving unit, then hangs up and returns to an idle state, ready to begin a new session.

Referring to FIG. 4A, the process of receiving a fax parallels the sending process. First, an incoming call is automatically answered (89), and a series of status messages pass between the sending and the receiving unit. Assuming the call proceeds, the transfer of facsimile data begins (91). The video portion of the data is processed concurrently as it is received (93) to remove any secondary compression of the video content.

As shown in FIG. 4B, the processing steps performed during reception are the reverse of those performed during transmission. In the preferred embodiment ("3-step" compression/decompression), secondary processing consists of first reconstructing the video sequence using a multi-frame decompression algorithm. Then the video sequence is re-compressed using a frame by frame algorithm which will be decoded in real-time when the facsimile is viewed and/or transferred to analog tape.

If digital output media is selected, then the secondary processing consists of reconstructing the video sequence as above, then re-compressing the data using the algorithm appropriate to the desired digital file format.

There will be instances where the secondary decompression is not performed concurrently with reception. For example, a fax may be received while the central processor is tied up supporting the playback of another fax. In such cases, the twice compressed video stream will be sent to temporary storage for later retrieval and decompression as shown in block 95 of FIG. 4A.

As decompression is completed, the resulting once compressed video stream is stored (97), after which the user is notified that a video fax has been received (99). The user may then select from among numerous options, including viewing the video fax, producing an analog output recording, which may subsequently be viewed, and producing a digital output file.

To view the video fax or produce an analog output recording, the once-compressed video stream is retrieved (101, 101'). Video decompression (algorithm "A", 103, 103') and audio decompression (105, 105') are performed, and the corresponding analog waveforms are reconstructed (107, 107'). The analog video waveform is displayed on a TV monitor (109, 109') or, alternatively, on a high-resolution (for example SVGA) computer monitor (111), and the audio waveform is played using one or more speakers (113, 113'). If analog output is desired, the analog waveforms are additionally output to an analog tape recorder for recording (115). The resulting tape may be played back and output to a TV monitor or the like for viewing and listening (117).

If digital output is desired, the user specifies the desired output format (119), whereupon the video file is retrieved (121) and translated to the specified file format (123). The resulting video file may then be transferred to a digital device or transferred over a digital LAN (125).

When finished, the user may specify that the video fax not be saved, in which case, the stored video fax data is erased (127) and the receiving unit is ready to begin again, or the user may specify that the video fax is archived, in which case the once-compressed video stream is retrieved (129), further compressed (131) and archived to mass storage (133) before being erased from buffer memory (135).

Referring to FIG. 5, the preferred embodiment of the video facsimile includes a central processor 31 complete with high-speed RAM memory 33, intermediate storage (either RAM or hard drive) 35, bulk storage 37, network interfaces 39, and a user interface 41 such as a keypad and small display, and dedicated hardware modules including video and audio compression "engines" 43 and 45 and video and audio decompression "engines" 53 and 55. A communication protocol "engine" 47, and a telephone network interface 49. The video facsimile is generally used in conjunction with a video monitor and an analog video source such as a video tape recorder.

The dedicated video compression engine 43 supports real-time compression of the analog video source material, typically at a frame rate of 30 fps. The objective of the real-time compression is the reduction of the source material bandwidth to match the capacity of the central processor 31, and also the reduction of the volume of source material data so as to reduce the requirements for intermediate buffer storage. Significantly, and unlike other video communication systems such as used for teleconferencing, the real-time compression does not reduce the bandwidth of the video signal to match the bandwidth of the telephone network interface. The modest compression requirement allows use of a relatively inexpensive video compression engine, which is at the same time capable of providing a high degree of video fidelity.

The dedicated video decompression engine 53 supports real-time decompression of partially compressed video facsimile data to an analog video format such as NTSC or PAL, for preview and review of video facsimiles, and for transferring of video facsimiles to analog video media such as video tape.

The dedicated audio compression engine 45 supports real-time compression and the audio decompression engine 55 supports real-time decompression of the analog audio source material, generally in two stereo channels. Because the processing requirements of audio compression are modest, the compression is completely performed in real-time.

In an alternate mode of operation, video and audio source material is received in a standard digital format. Data is received or transferred through a relatively high speed local data network, such as EtherNet.

A dedicated communication protocol engine 47 performs transmission related functions such as call initiation, packetization, error control coding, and handshaking using one or more highly developed communication protocols such as LAPB. The communication protocol engine also provides for setup and dialing of the telephone network interface. The telephone network could consist of a high-speed analog modem (operating, for instance, at 9600 bps), however, a higher capacity digital service such as Switched-56 or ISDN is preferred.

Higher bandwidth services such as Switched-384 (384 kbits per second) or Switched-T1 (1.54 Mbits per second) may be employed as they become widely available.

The central processor 31 is a general purpose microprocessor such as a Intel 80486 or Motorola 68040, which are well suited to perform a variety of functions in parallel including transfer of video and audio data blocks, video and audio data compression and decompression, intermediate and bulk storage management, and user interface related functions. The central processor utilizes an application and operating system software architecture well suited for concurrent processing of time-critical tasks.

In the preferred embodiment, the high compression ratio video compression is performed as a software task within the central processor. Despite the limited throughput capacity of a general purpose microprocessor, the software compression algorithm can perform complex video compression, because the overall facsimile transmission time, and consequently the time available for video compression, is dominated by the throughput capacity of the telephone network interface. Performing video compression and decompression concurrent with facsimile transmission rather than during live-video capture enables the video facsimile unit to provide a much higher frame rate, and greater video quality, than systems which deliver video in real-time.

The central processor 31 operates in conjunction with high-speed RAM 33, intermediate storage 35 (typically a hard disk or RAM memory), and low speed bulk storage 37 (typically a large hard disk, digital tape, or optical media). During the capture of a video clip, the high speed RAM is used to store moderately compressed video and audio data which is being generated by the video and audio compression engines 43 and 45. Simultaneously, data from the RAM 33 is transferred to the intermediate storage which is sized to hold a complete video facsimile in the moderately compressed ("once compressed") format.

Similarly during review of video clips, or when video clips are being transferred to analog media, the high speed RAM 33 is used to buffer the transfer of moderately compressed video and audio data to the video and audio decompression engines 53 and 55 which are performing final reconstruction of the facsimile.

The throughput capacity of the intermediate storage 35 must be sufficient to keep up with the video and audio compression engines operating at the full-frame rate. However, because the high speed RAM operates as an "elastic" buffer, the instantaneous capacity of the intermediate storage 35 can vary. Therefore, the intermediate storage 35 can use a medium with slow access time but high average throughput capacity, such as a hard disk.

The low-speed bulk storage 37 is used to archive video clips, usually in the moderately compressed format. The bulk storage 37 is large enough to hold several complete video clips, which may have been received when the video facsimile unit was unattended. At the sending unit, bulk storage is used to store one or more video clips for future transmission. This avoids tying up the sending video facsimile unit when the unit at the destination is temporarily unavailable.

The bulk-storage medium 37 can have a slow access time, and the overall throughput capacity of the bulk storage can be low because the transfer of video clips to and from bulk storage is performed at a frame rate which is lower than the real-time capture rate. This approach allows the use of a cost-effective mass storage medium such as magnetic tape or optical disk.

Analog audio and video signals are routed through a muting switcher 51, controlled by the central processor 31. This automatic router relieves the user from having to do any reconfiguring of the cables during any of the various operational modes.

Many commercially available video tape recorders have provision for automatic control. In the preferred embodiment, the Machine Control circuitry 52 controls the VTR during capture and transfer-to-tape operations, further simplifying the user interface.

Referring to FIG. 6, in the preferred embodiment, the central processor 31 uses a multi-tasking operating system kernel which facilitates concurrent completion of a number of tasks on a priority basis. Task switching is preferably on a preemptive basis, whereby tasks priorities are re-evaluated periodically based on interrupts generated by a system timer and other hardware events.

During capture of a video clip, the software runs several concurrent tasks including a task which transfers video and audio data from the compression engines 43, 45 to high-speed RAM 33 and a task which transfers data from high-speed RAM 33 to intermediate buffer storage 35. Similarly, during review of a video clip, tasks run which transfer data from intermediate storage 35 to high-speed RAM 33, and from high-speed RAM 33 to video and audio decompression engines 53, 55.

During transmission or reception of a video clip, tasks which run concurrently include a task performing software compression or decompression, a task which formats and de-formats data being transferred to and from the communications engine, and a task which monitors the communication link and responds to network management commands. At all times, a user-interface task updates the user display and monitors and responds to keypad inputs.

The software architecture includes drivers which manage and provide high-level interfaces to hardware elements of the unit such as the video and audio compression and decompression engines 43, 45, 53, 55, the communication engine 47, intermediate storage 35 and bulk storage 37. High-speed RAM 33 is maintained by a memory manager which works through the operating system to assign memory resources to tasks based on task priorities.

Referring to FIG. 7A, the preferred embodiment performs video compression in a dedicated compression engine using an adaption of the JPEG algorithm to motion video consisting of the following steps:

(1) demodulation and digitization of the input video signal, in the NTSC or PAL format, and color space conversion to produce three digital bit streams consisting of one channel (Y) of luminance (brightness) and two channels (Cr, Cb) of chrominance;
(2) decimation and/or sub sampling of the chrominance channels, to reduce bandwidth;
(3) subdivision of the picture into blocks each consisting of 8×8 pixels;
(4) transform coding of each block for each channel using a discrete cosine transform (DCT)
(5) quantization of the DCT coefficients based on a table of thresholds;
(6) reordering of the coefficients in a ziz-zag manner corresponding to spatial frequency;
(7) run-length coding of the DCT coefficients;
(8) Huffman (statistical) coding of the run-length coefficients;
(9) interleaving of the data streams and quantization tables as well as framing information into an overall file format, preferably an industry standard format such as proposed by the JPEG standard.

Additional information concerning intraframe compression techniques of the type described may be found in International Standard ISO/IEC DIS 10918-1, "Information technology—Digital compression and coding of continuous-tone still images", informally and commonly referred to as the JPEG (Joint Photographic Experts Group) standard.

As shown in FIG. 7B, the video decompression engine performs decompression using a complementary set of steps, the final step being the reconstruction of a standard composite video signal in the NTSC or PAL format.

A key software task performs video compression and decompression using techniques which exploit the inherent information redundancy in a video sequence. A preferred embodiment of the secondary software compression consists of a two stage process where the initial stage consists of decompression of individual video frames using the complement of the algorithm used in the video compression engine (i.e., the software equivalent of the steps illustrated in FIG. 7B), and where the second stage consists of compression using a multiple-frame algorithm which is capable of providing a high compression ratio. These two stages are shown in FIG. 8A and FIG. 8B respectively. They are also shown as the two offline steps in FIG. 9B, "3-step compression".

Full frame rate decompression (algorithm "A", FIG. 7B) and reduced frame rate decompression (algorithm "A", FIG. 8A) differ only in that, in the case of the full frame rate decompression (FIG. 7B), the luminance and chrominance signals Y, Cr, and Co are converted to RGB color space, then used to reconstruct an analog video waveform such as an NTSC or PAL waveform. In the case of FIG. 8A, the decompression is performed preparatory to secondary compression. To produce an uncompressed digital video signal for subsequent secondary compression, the R, G and B digital components are interleaved.

Referring to FIG. 8B, secondary compression (algorithm "B") is per the MPEG standard and involves the following processing steps:
(1) Selecting reference frames ("I" for intra) from the video sequence. Reference frames are selected to be typically every fourth to thirteenth original frame. The intervals between "I" frames form the boundaries of short video sequences to be compressed based on motion.
(2) Periodically within this sequence, replacing original frames, typically every 3rd or 4th frame, with predicted ("P") frames.
(3) Replacing the remaining original frames by interpolated frames ("B" for bidirectional interpolation). A typical sequence of original frames would thus be replaced by a compressed set of frames in the sequence IBBBPBBBPBBBI, etc. Predicted and interpolated frames are formed by comparing actual frames to motion compensated estimates of the nearest reference frames, either reference or predictive. The difference between the actual and estimated frame is encoded as an error signal.
(4) Much of the frame processing is identical to that described in FIG. 7A. However, the frames must be reordered prior to processing, into the sequence IPBBPBBPBBIBB, etc. "I" frames are treated virtually identically to the discrete frames processing of FIG. 7A. The "I" frames and "P" frames are stored to serve as past and future references for processing the remaining frames.
(5) Generating "P" frames by first performing an estimate of temporal motion within the frame compared to the previously stored "I" or "P" frame reference; then applying this motion estimate via calculated motion vectors to the stored reference frame, which generates an estimate of the "P" frame ("motion compensated estimate"); then taking the spatial difference between the original uncompressed frame and this estimate, which generates an error term; this error term is then encoded as if it were a full frame—using DCT quantization, etc. What is then stored and subsequently transmitted for a "P" frame consists of the motion vectors and the spatial error term coefficients.

(6) Generating "B" frames in a manner similar to that for "P" frames, except the motion estimates are performed by making comparisons to both past and future reference frames. The resulting motion vectors may reference either or both reference frames.

(7) Performing motion estimation on 16×16 pixel macroblocks, where the motion estimation function performs a search for the best-match block indicating the amount of temporal motion present in this frame; then generating a motion vector for this macroblock; this is performed for all macroblocks in the frame. Each motion vector describes the horizontal and vertical displacement of a 16×16 macroblock. The movement of these macro-blocks from frame to frame is estimated by forming several displaced versions of the macro-block and selecting the displacement which minimizes the mismatch between a macro-block and its displaced version. Thus, for each predicted or interpolated frame, a set of motion vectors is formed describing the movement of portions of this frame from the reference. Motion Compensation is a process whereby the vectors are applied to the stored reference frame or frames to form a motion-compensated estimate.

(8) Compressing I-frames and the prediction error terms from P and B frames using single frame processing techniques similar to those illustrated in FIG. 7A. The single frame processing steps include discrete cosine transform, zig-zag coefficient re-ordering, quantization using a table of thresholds, and variable length coding. The thresholds used for coefficient quantization are chosen so as to provide high quality for reference frames, and reduced quality for interpolated frames.

(9) Compressing motion vectors by differential encoding and variable length coding.

(10) Multiplexing the compressed motion sequence elements (reference frames, error signals, and motion vectors and table and header information) together into an overall file format.

Additional information concerning the described secondary compression technique may be found in International Standard ISO/IEC DIS 11172, "Information technology— Coding of moving pictures and associated audio for digital storage media up to about 1.5 Mbits/s", Informally and commonly referred to as MPEG (Moving Pictures Experts Group) standard.

Secondary software decompression consists of two stages which complement the stages used in software compression. The first stage (FIG. 8C) performs high expansion decompression using the complement of the motion compensation technique described. The second stage (FIG. 8D) consists of the re-compression of the sequence, at a relatively low compression ratio, in a format suitable for real-time decompression by the dedicated video compression engine. The process parallels that used for compression. Referring to FIG. 8C, the compressed motion sequence elements are de-multiplexed. Motion vectors are decompressed and decoded. Difference codes are decompressed using variable length decoding, coefficient reordering, dequantization and inverse DCT transformation.

For "I" frames, there are no motion vectors, and the decoded DCT coefficients correspond to blocks of pixel values. These values are therefore passed unaltered to the frame reconstruction unit, as well as being stored in the frame buffer for use in decoding motion compensated ("B" or "P") frames. In the case of "P" frames, the decoded coefficients correspond to differences between the present frame and the motion compensated estimate of last-most occurring reference frame. The reference frame data values are therefore motion compensated and added to the decoded "P" values. The sums generated correspond to pixel values for the "P" frame, which are output to the frame reconstruction unit and also stored in the reference frame buffer. For "B" frames, predicted values are calculated from the pixel data stored in the past and future frame buffers, depending on whether the respective motion vectors are forward or backward vectors or both. The generated "B" frame pixel values are applied to the frame reconstruction unit. The block and frame reconstruction unit reconstructs the original frames from I, P and B blocks in Y, Cr, and Cb color space. The frames are then reordered, converted to RGB color space, and interleaved to produce an uncompressed digital video signal.

After the multi-frame decompression is complete on a set of frames, the frames are individually re-compressed using the frame by frame algorithm "A" as illustrated in FIG. 8D (compare with FIG. 7A).

FIGS. 9A–9E illustrate details of selected data flow paths. FIG. 9A illustrates two-step compression and FIG. 9B illustrates three-step compression, whereas FIG. 9C illustrates two-step decompression and FIG. 9D illustrates three-step decompression. FIG. 9E illustrates data flow during archiving. From the previous description, the details of the data flow paths of FIG. 9A–9E will be readily apparent.

The described video fax system fills a need that has heretofore remain unfulfilled. Quality video fax delivery may be achieved in a reasonable delivery time by using a combination of real-time and off-line compression and by taking full advantage of concurrency. The user is afforded complete control of the trade-off between transmission quality and transmission time. As multimedia brings video to desktop computers, making video a commonplace medium for creative interchange, the video fax promises to fill an equally widespread and important role as the paper fax.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of transmitting selected motion video content from a first user to a second user, comprising:

at a first geographic location, playing from an analog source a motion video segment and converting the motion video segment into a motion video stream;

compressing the motion video stream using real-time compression to produce a once-compressed motion video stream;

displaying the motion video segment;

based on display of the motion video segment, selecting at least a portion of the motion video segment in response to one or more commands of the first user;

storing as a motion video file a portion of the once-compressed motion video stream corresponding to the portion of the motion video segment selected;

within a fixed period of time determined in response to one or more commands of the first user, retrieving the motion video file; and transmitting at a reduced, subvideo, frame rate through a telephone network from the first geographic location to a second geographic location of the second user, and receiving at the second geographic location, the motion video file.

2. The method of claim 1, wherein displaying the motion video segment comprises:

applying real-time motion video decompression to the once-compressed motion video stream;

converting the resulting motion video stream to an analog motion video signal; and displaying the analog motion video signal.

3. The method of claim 1, further comprising:

previous to transmitting, retrieving the motion video file;

applying real-time motion video decompression to the motion video file;

converting the resulting motion video stream to an analog motion video signal; and displaying the analog motion video signal.

4. The method of claim 3, further comprising:

repeating the steps of claims 1 and 3 at least once to produce a resulting motion video stream that is satisfactory to the viewer.

5. The method of claim 1, wherein the analog source is a motion video tape player.

6. The method of claim 1, further comprising:

at the second geographic location, storing the motion video file.

7. The method of claim 6, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

8. The method of claim 6, further comprising:

at the second geographic location, receiving and storing one or more additional received motion video files coexisting with the first received motion video file.

9. The method of claim 6, further comprising:

presenting to an external source the motion video file.

10. The method of claim 9, further comprising:

prior to presenting the motion video file to the external source, converting the motion video file to a different compressed motion video format.

11. The method of claim 1, wherein the motion video segment and each motion video stream also includes audio information.

12. The method of claim 11, wherein the audio information is compressed and decompressed only during real time compression and real time decompression, respectively.

13. A method of transmitting selected motion video content from a first user to a second user, comprising:

at a first geographic location, playing from an analog source a motion video segment and converting the motion video segment into a motion video stream;

compressing the motion video stream using real-time compression to produce a once-compressed motion video stream;

displaying the motion video segment;

based on display of the motion video segment, selecting at least a portion of the motion video segment in response to one or more commands of the first user;

storing as a motion video file a portion of the once-compressed motion video stream corresponding to the portion of the motion video segment selected;

within a fixed period of time determined in response to one or more commands of the first user, retrieving the motion video file;

applying secondary compression at a reduced, subvideo, frame rate to the motion video file to produce a twice-compressed motion video stream; and transmitting at a reduced, subvideo, frame rate through a telephone network from the first geographic location to a second geographic location of the second user, and receiving at the second geographic location, the twice-compressed motion video stream.

14. The method of claim 13, wherein the steps of applying secondary compression and transmitting are performed concurrently.

15. The method of claim 13, further comprising:

at the second geographic location, applying secondary decompression to the twice-compressed motion video stream; and storing as a motion video file the resulting once-compressed motion video stream.

16. The method of claim 15, wherein the steps of receiving and applying secondary decompression are performed concurrently.

17. The method of claim 15, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

18. The method of claim 17, further comprising:

recording the analog motion video signal.

19. The method of claim 18, wherein the recording device is a motion video tape recorder.

20. The method of claim 15, further comprising:

at the second geographic location, receiving and storing one or more additional received motion video files coexisting with the first received motion video file.

21. The method of claim 15, further comprising:

presenting to an external source the motion video file.

22. The method of claim 21, further comprising:

prior to presenting the motion video file to the external source, converting the motion video file to a different compressed motion video format.

23. The method of claim 13, further comprises:

at the second geographic location, storing as a twice-compressed motion video file the twice-compressed motion video stream;

retrieving from the twice-compressed motion video file the twice-compressed motion video stream;

applying secondary decompression to the twice-compressed motion video stream; and storing as a motion video file the resulting once-compressed motion video stream.

24. The method of claim 23, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

25. The method of claim 24, further comprising:
recording the analog motion video signal.

26. The method of claim 25, wherein the recording device is a motion video tape recorder.

27. The method of claim 230, further comprising:
at the second geographic location, receiving and storing one or more additional received motion video files coexisting with the first received motion video file.

28. The method of claim 23, further comprising:
presenting to an external source the motion video file.

29. The method of claim 28, further comprising:
prior to presenting the motion video file to the external source, converting the motion video file to a different compressed motion video format.

30. A method of transmitting selected motion video content from a first user to a second user, comprising:
at a first geographic location, playing from an analog source a motion video segment and converting the motion video segment into a motion video stream;
compressing the motion video stream using real-time compression to produce a once-compressed motion video stream;
displaying the motion video segment;
based on display of the motion video segment, selecting at least a portion of the motion video segment in response to one or more commands of the first user;
storing as a motion video file a portion of the once-compressed motion video stream corresponding to the portion of the motion video segment selected;
within a fixed period of time determined in response to one or more commands of the first user, retrieving the motion video file;
applying secondary compression at a reduced, subvideo, frame rate to the motion video file to produce a twice-compressed motion video stream;
storing as a twice-compressed motion video file the twice-compressed motion video stream;
retrieving from the twice-compressed motion video file, the twice-compressed motion video stream; and
transmitting at a reduced, subvideo, frame rate through a telephone network from the first geographic location to a second geographic location of a second user, and receiving at the second geographic location, the twice-compressed motion video stream.

31. The method of claim 30, further comprising:
at the second geographic location, applying secondary decompression to the twice-compressed motion video stream; and
storing as a motion video file the resulting once-compressed motion video stream.

32. The method of claim 31, wherein the steps of receiving and applying secondary decompression are performed concurrently.

33. The method of claim 31, further comprising:
retrieving from the received motion video file a once-compressed motion video stream;
applying real-time motion video decompression to the once-compressed motion video stream;
converting the resulting motion video stream to an analog motion video signal; and
displaying the analog motion video signal.

34. The method of claim 33, further comprising:
recording the analog motion video signal.

35. The method of claim 34, wherein the recording device is a motion video tape recorder.

36. The method of claim 31, further comprising:
at the second geographic location, receiving and storing one or more additional received motion video files coexisting with the first received motion video file.

37. The method of claim 31, further comprising:
presenting to an external source the motion video file.

38. The method of claim 37, further comprising:
prior to presenting the motion video file to the external source, converting the motion video file to a different compressed motion video format.

39. The method of claim 30, further comprising:
at the second geographic location, storing as a twice-compressed motion video file the twice-compressed motion video stream;
retrieving from the twice-compressed motion video file the twice-compressed motion video stream;
applying secondary decompression to the twice-compressed motion video stream; and
storing as a motion video file the resulting once-compressed motion video stream.

40. The method of claim 39, further comprising:
retrieving from the received motion video file a once-compressed motion video stream;
applying real-time motion video decompression to the once-compressed motion video stream;
converting the resulting motion video stream to an analog motion video signal; and
displaying the analog motion video signal.

41. The method of claim 40, further comprising:
recording the analog motion video signal.

42. The method of claim 41, wherein the recording device is a motion video tape recorder.

43. The method of claim 39, further comprising:
at the second geographic location, receiving and storing one or more additional received motion video files coexisting with the first received motion video file.

44. The method of claim 39, further comprising:
presenting to an external source the motion video file.

45. The method of claim 44, further comprising:
prior to presenting the motion video file to the external source, converting the motion video file to a different compressed motion video format.

46. A method of transmitting selected motion video content from a first user to a second user, comprising:
at a first geographic location, displaying a motion video segment;
based on display of the motion video segment, selecting at least a portion of the motion video segment in response to one or more commands of the first user;
compressing at least a portion of the motion video segment selected to form a once-compressed motion video stream and storing the once-compressed motion video stream as a motion video file;
within a fixed period of time determined in response to one or more commands of the first user, retrieving the motion video file; and
transmitting at a reduced, subvideo, frame rate through a telephone network from the first geographic location to a second geographic location of a second user, and receiving at the second geographic location, the motion video file.

47. The method of claim 46, further comprising:

previous to transmitting, altering the format of the motion video file.

48. The method of claim 46, further comprising:

previous to transmitting, retrieving the motion video file;

applying real-time motion video decompression to the motion video file;

converting the resulting motion video stream to an analog motion video signal; and displaying the analog motion video signal.

49. The method of claim 48, further comprising:

repeating the steps of claims 41 and 43 at least once to produce a resulting motion video stream that is satisfactory to the viewer.

50. The method of claim 46, further comprising:

at the second geographic location, storing the motion video file.

51. The method of claim 50, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

52. The method of claim 50, further comprising:

at the second geographic location, receiving and storing one or more additional received motion video files coexisting with the first received motion video file.

53. The method of claim 50, further comprising:

presenting to an external source the motion video file.

54. The method of claim 53, further comprising:

prior to presenting the motion video file to the external source, converting the motion video file to a different compressed motion video format.

55. The method of claim 46, wherein the motion video segment and each motion video stream also includes audio information.

56. The method of claim 55, wherein the audio information is compressed and decompressed only during real time compression and real time decompression, respectively.

57. A method of transmitting selected motion video content from a first user to a second user, comprising:

at a first geographic location, displaying a motion video segment;

based on display of the motion video segment, selecting at least a portion of the motion video segment in response to one or more commands of the first user;

compressing at least a portion of the motion video segment selected to form a once-compressed motion video stream and storing the once-compressed motion video stream as a motion video file;

within a fixed period of time determined in response to one or more commands of the first user, retrieving the motion video file at a reduced, subvideo, frame rate;

applying secondary compression at a reduced, subvideo, frame rate to the motion video file to produce a twice-compressed motion video stream; and transmitting at a reduced, subvideo, frame rate through a telephone network from the first geographic location to a second geographic location of a second user, and receiving at the second geographic location, the twice-compressed motion video stream.

58. The method of claim 57, wherein the steps of applying secondary compression and transmitting are performed concurrently.

59. The method of claim 57, further comprising:

at the second geographic location, applying secondary decompression to the twice-compressed motion video stream; and storing as a motion video file the resulting once-compressed motion video stream.

60. The method of claim 59, wherein the steps of receiving and applying secondary decompression are performed concurrently.

61. The method of claim 59, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

62. The method of claim 61, further comprising:

recording the analog motion video signal.

63. The method of claim 62, wherein the recording device is a motion video tape recorder.

64. The method of claim 59, further comprising:

at the second geographic location, receiving and storing one or more additional received motion video files coexisting with the first received motion video file.

65. The method of claim 59, further comprising:

presenting to an external source the motion video file.

66. The method of claim 65, further comprising:

prior to presenting the motion video file to the external source, converting the motion video file to a different compressed motion video format.

67. The method of claim 57, further comprising:

at the second geographic location, storing as a twice-compressed motion video file the twice-compressed motion video stream;

retrieving from the twice-compressed motion video file the twice-compressed motion video stream;

applying secondary decompression to the twice-compressed motion video stream; and storing as a motion video file the resulting once-compressed motion video stream.

68. The method of claim 67, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

69. The method of claim 68, further comprising:

recording the analog motion video signal.

70. The method of claim 69, wherein the recording device is a motion video tape recorder.

71. The method of claim 67, further comprising:

at the second geographic location, receiving and storing one or more additional received motion video files coexisting with the first received motion video file.

72. The method of claim 67, further comprising:

presenting to an external source the motion video file.

73. The method of claim 72, further comprising:

prior to presenting the motion video file to the external source, converting the motion video file to a different compressed motion video format.

74. A method of transmitting selected motion video content from a first user to a second user, comprising:

at a first geographic location, displaying a motion video segment;

based on display of the motion video segment, selecting at least a portion of the motion video segment in response to one or more commands of the first user;

compressing at least a portion of the motion video segment selected to form a once-compressed motion video stream and storing the once-compressed motion video stream as a motion video file:

within a fixed period of time determined in response to one or more commands of the first user, retrieving the motion video file;

applying secondary compression at a reduced, subvideo, frame rate to the motion video file to produce a twice-compressed motion video stream;

storing as a twice-compressed motion video file the twice-compressed motion video stream;

retrieving from the twice-compressed motion video file, the twice-compressed motion video stream; and transmitting at a reduced, subvideo, frame rate through a telephone network from the first geographic location to a second geographic location of a second user, and receiving at the second geographic location, the twice-compressed motion motion video stream.

75. The method of claim 74, further comprising:

at the second geographic location, applying secondary decompression to the twice-compressed motion motion video stream; and storing as a motion video file the resulting once-compressed motion video stream.

76. The method of claim 75, wherein the steps of receiving and applying secondary decompression are performed concurrently.

77. The method of claim 75, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

78. The method of claim 77, further comprising:

recording the analog motion video signal.

79. The method of claim 78, wherein the recording device is a motion video tape recorder.

80. The method of claim 75, further comprising:

at the second geographic location, receiving and storing one or more additional received motion video files coexisting with the first received motion video file.

81. The method of claim 75, further comprising:

presenting to an external source the motion video file.

82. The method of claim 81, further comprising:

prior to presenting the motion video file to the external source, converting the motion video file to a different compressed motion video format.

83. The method of claim 74, further comprising:

at the second geographic location, storing as a twice-compressed motion video file the twice-compressed motion video stream;

retrieving from the twice-compressed motion video file the twice-compressed motion video stream;

applying secondary decompression to the twice-compressed motion video stream; and storing as a motion video file the resulting once-compressed motion video stream.

84. The method of claim 83, further comprising:

retrieving from the received motion video file a once-compressed motion video stream;

applying real-time motion video decompression to the once-compressed motion video stream;

converting the resulting motion video stream to an analog motion video signal; and displaying the analog motion video signal.

85. The method of claim 84, further comprising:

recording the analog motion video signal.

86. The method of claim 85, wherein the recording device is a motion video tape recorder.

87. The method of claim 83, further comprising:

at the second geographic location, receiving and storing one or more additional received motion video files coexisting with the first received motion video file.

88. The method of claim 83, further comprising:

presenting to an external source the motion video file.

89. The method of claim 88, further comprising:

prior to presenting the motion video file to the external source, converting the motion video file to a different compressed motion video format.

90. A method comprising:

applying real-time compression to an original motion video stream to produce a once-compressed motion video stream;

storing as a motion video file a portion of the once-compressed motion video stream;

retrieving from the motion video file at a reduced, subvideo, frame rate the motion video file;

applying secondary compression at a reduced, subvideo, frame rate to the motion video file to produce a twice-compressed motion video stream; and transmitting to a remote geographic location at a reduced, subvideo, frame rate the twice-compressed motion video stream.

91. The method of claim 90, wherein secondary compression comprises:

applying decompression to the motion video file to produce an approximation of the original motion video stream; and applying compression to said approximation of the original motion video stream to produce the twice-compressed motion video stream.

92. The method of claim 91, wherein decompression of the motion video file and compression of the motion video stream are performed concurrently to minimize the storage requirements for storing the approximation of the original motion video stream.

93. The method of claim 91, comprising the further steps of:

receiving at the remote geographic location the twice-compressed motion video stream;

applying to said twice compressed motion video stream secondary decompression at a reduced, subvideo, frame rate to produce an approximation of the once compressed motion video stream; and applying to said approximation of the once-compressed motion video stream real-time decompression.

94. The method of claim 91, comprising the further steps of:

receiving at the remote geographic location the twice-compressed motion video stream; and applying to said twice-compressed motion video stream real-time decompression.

95. The method of claim 91, comprising the further steps of:

receiving at the remote geographic location the twice-compressed motion video stream;

applying to said twice-compressed motion video stream secondary decompression at a reduced, sub-motion video, frame rate to produce an approximation of the original motion video stream;

applying to said approximation of the original motion video stream reduced frame-rate compression to produce a once-compressed motion video stream; and applying real-time decompression to the once-compressed motion video stream.

96. The method of claim 90, comprising the further steps of:

receiving at the remote geographic location the twice-compressed motion video stream;

applying to said twice compressed motion video stream secondary decompression at a reduced, subvideo, frame rate to produce an approximation of the once compressed motion video stream; and applying to said approximation of the once-compressed motion video stream real-time decompression.

97. The method of claim 90, comprising the further steps of:

receiving at the remote geographic location the twice-compressed motion video stream; and applying to said twice-compressed motion video stream real-time decompression.

98. A motion video fax station comprising:

a central processor;

multi-level storage means connected to the central processor for storing at least one digital motion video file;

means for inputting a digital motion video file to the multi-level storage means and outputting a digital motion video file from the multi-level storage means;

an analog interface for selectively receiving audio and motion video signals from and selectively providing audio and motion video signals to a plurality of media devices;

means connecting to the analog interface and the central processor for performing real-time compression of audio and motion video signals;

means connected to the analog interface and the central processor for performing real-time decompression of audio and motion video signals;

means for interfacing with, transmitting compressed audio and motion video signals to, and receiving compressed audio and motion video signals from a telephone network, thereby achieving two-way motion video communication; and means connected to the central processor for indicating to a user an operational status of the system and for receiving user commands.

99. The motion video fax station of claim 98, further comprising:

means for performing secondary compression and decompression of compressed motion video streams.

100. The motion video fax station of claim 98, wherein the means for performing secondary compression and decompression performs secondary compression at a rate less than 25 frames per second.

101. The motion video fax station of claim 98, further comprising:

means within the central processor for performing secondary compression and decompression of compressed motion video streams.

102. The motion video fax station of claim 101, wherein the means for performing secondary compression and decompression performs secondary compression at a rate less than 25 frames per second.

103. A motion video fax system comprising a plurality of motion video fax stations as recited in claim 98, and a telephone network.

104. The motion video fax station of claim 103, wherein the telephone network comprises a plurality of temporarily established point-to-point connections.

105. A motion video fax station comprising:

a central processor;

multi-level storage means connected to the central processor for storing at least one digital motion video file;

means for receiving a digital motion video file from an external source;

means for inputting a digital motion video file to the multi-level storage means and outputting a digital motion video file from the multi-level storage means;

means connected to the central processor for performing real-time decompression of audio and motion video signals;

means for interfacing with, transmitting audio and motion video signals to, and receiving compressed audio and motion video signals from, a telephone network, thereby achieving two-way motion video communication; and means connected to the central processor for indicating to a user an operational status of the system and for receiving user commands.

106. The motion video fax station of claim 105, further comprising means for outputting a digital motion video file to an external destination.

107. The motion video fax station of claim 106, further comprising:

means for performing secondary compression and decompression of compressed motion video streams.

108. The motion video fax station of claim 107, wherein the means for performing secondary compression and decompression performs secondary compression at a rate less than 25 frames per second.

109. The motion video fax station of claim 105, further comprising:

means within the central processor for performing secondary compression and decompression of compressed motion video streams.

110. The motion video fax station of claim 109, wherein the means for performing secondary compression and decompression performs secondary compression at a rate less than 25 frames per second.

111. A motion video fax system comprising a plurality of motion video fax stations as recited in claim 105, and a telephone network.

112. The motion video fax station of claim 111, wherein the telephone network comprises a plurality of temporarily established point-to-point connections.

113. A motion video fax station comprising:

a central processor;

multi-level storage means connected to the central processor for storing at least one digital motion video file;

means for receiving a digital motion video file from an external source;

means for inputting a digital motion video file to the multi-level storage means and outputting a digital motion video file from the multi-level storage means;

an analog interface for selectively receiving audio and motion video signals from and selectively providing audio and motion video signals to a plurality of media devices;

means connected to the analog interface and the central processor for performing real-time compression of audio and motion video signals;

means connected to the analog interface and the central processor for performing real-time decompression of audio and motion video signals;

means for interfacing with, transmitting compressed audio and motion video signals to, and receiving compressed audio and motion video signals from, a telephone network, thereby achieving two-way motion video communication; and means connected to the central processor for indicating to a user an operational status of the system and for receiving user commands.

114. The motion video fax station of claim 113, further comprising means for outputting a digital motion video file to an external destination.

115. The motion video fax station of claim 113, further comprising:

means for performing secondary compression and decompression of compressed motion video streams.

116. The motion video fax station of claim 115, wherein the means for performing secondary compression and decompression performs secondary compression at a rate less than 25 frames per second.

117. The motion video fax station of claim 113, further comprising:

means within the central processor for performing secondary compression and decompression of compressed motion video streams.

118. The motion video fax station of claim 117, wherein the means for performing secondary compression and decompression performs secondary compression at a rate less than 25 frames per second.

119. A motion video fax system comprising a plurality of motion video fax stations as recited in claim 113, and a telephone network.

120. The motion video fax station of claim 119, wherein the telephone network comprises a plurality of temporarily established point-to-point connections.

* * * * *